United States Patent
Akash et al.

(10) Patent No.: US 12,097,892 B2
(45) Date of Patent: Sep. 24, 2024

(54) SYSTEM AND METHOD FOR PROVIDING AN RNN-BASED HUMAN TRUST MODEL

(71) Applicant: Honda Motor Co., Ltd., Tokyo (JP)

(72) Inventors: Kumar Akash, Milpitas, CA (US); Teruhisa Misu, Mountain View, CA (US); Xingwei Wu, Sunnyvale, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 277 days.

(21) Appl. No.: 17/467,159

(22) Filed: Sep. 3, 2021

(65) Prior Publication Data
US 2022/0324490 A1 Oct. 13, 2022

Related U.S. Application Data

(60) Provisional application No. 63/173,733, filed on Apr. 12, 2021.

(51) Int. Cl.
*B60W 60/00* (2020.01)
*G05B 13/02* (2006.01)
(Continued)

(52) U.S. Cl.
CPC .... *B60W 60/0059* (2020.02); *B60W 60/0053* (2020.02); *G05B 13/027* (2013.01);
(Continued)

(58) Field of Classification Search
CPC ......... B60W 60/0059; B60W 60/0053; B60W 2420/42; B60W 2420/52; B60W 2540/30;
(Continued)

(56) References Cited

U.S. PATENT DOCUMENTS

| | | | |
|---|---|---|---|
| 2015/0246673 A1* | 9/2015 | Tseng ................ | B60W 60/0013 701/23 |
| 2018/0170375 A1* | 6/2018 | Jang .................... | G06V 20/597 |

(Continued)

OTHER PUBLICATIONS

K. Akash, W.-L. Hu, N. Jain, and T. Reid, "A Classification Model for Sensing Human Trust in Machines Using EEG and GSR," ACM Transactions on Interactive Intelligent Systems, vol. 8, No. 4, pp. 1-20, Nov. 2018.

(Continued)

*Primary Examiner* — James J Lee
*Assistant Examiner* — Alexander George Matta
(74) *Attorney, Agent, or Firm* — RANKIN, HILL & CLARK LLP

(57) ABSTRACT

A system and method for providing an RNN-based human trust model that include receiving a plurality of inputs related to an autonomous operation of a vehicle and a driving scene of the vehicle and analyzing the plurality of inputs to determine automation variables and scene variables. The system and method also include outputting a short-term trust recurrent neural network state that captures an effect of the driver's experience with respect to an instantaneous vehicle maneuver and a long-term trust recurrent neural network state that captures the effect of the driver's experience with respect to the autonomous operation of the vehicle during a traffic scenario. The system and method further include predicting a take-over intent of the driver to take over control of the vehicle from an automated operation of the vehicle during the traffic scenario.

20 Claims, 7 Drawing Sheets

(51) Int. Cl.
*G06N 3/044* (2023.01)
*G06V 20/56* (2022.01)

(52) U.S. Cl.
CPC ............. *G06N 3/044* (2023.01); *G06V 20/56* (2022.01); *B60W 2420/403* (2013.01); *B60W 2420/408* (2024.01); *B60W 2540/30* (2013.01); *B60W 2554/40* (2020.02); *B60W 2556/10* (2020.02); *B60W 2556/45* (2020.02)

(58) Field of Classification Search
CPC ......... B60W 2554/40; B60W 2556/10; B60W 2556/45; G05B 13/027; G06N 3/044; G06N 3/08; G06V 20/56; G06V 10/82; G06V 20/597
See application file for complete search history.

(56) References Cited

U.S. PATENT DOCUMENTS

| | | | | |
|---|---|---|---|---|
| 2019/0101985 | A1* | 4/2019 | Sajda | G06F 3/017 |
| 2020/0117187 | A1* | 4/2020 | Kothari | G06F 21/32 |
| 2021/0200229 | A1* | 7/2021 | Refaat | G06N 3/084 |
| 2021/0224648 | A1* | 7/2021 | Zhuang | G06N 3/045 |
| 2022/0281461 | A1* | 9/2022 | Gentner | B60W 50/14 |

OTHER PUBLICATIONS

K. Akash, W.-L. Hu, T. Reid, and N. Jain, "Dynamic modeling of trust in human-machine interactions," in American Control Conference (ACC), 2017. IEEE, 2017, pp. 1542-1548.
K. Akash, N. Jain, and T. Misu, "Toward Adaptive Trust Calibration for Level 2 Driving Automation," in Proceedings of the 2020 International Conference on Multimodal Interaction, ser. ICMI '20. New York, NY, USA: Association for Computing Machinery, Oct. 2020, pp. 538-547.
K. Akash, G. McMahon, T. Reid, and N. Jain, "Human Trust-Based Feedback Control: Dynamically Varying Automation Transparency to Optimize Human-Machine Interactions," IEEE Control Systems Magazine, vol. 40, No. 6, pp. 98-116, Dec. 2020.
K. Akash, T. Reid, and N. Jain, "Improving Human-Machine Collaboration Through Transparency-based Feedback—Part II: Control Design and Synthesis," IFAC-PapersOnLine, vol. 51, No. 34, pp. 322-328, Jan. 2019.
H. Azevedo-Sa, S. K. Jayaraman, C. T. Esterwood, X. J. Yang, L. P. Robert, and D. M. Tilbury, "Real-Time Estimation of Drivers' Trust in Automated Driving Systems," International Journal of Social Robotics, Sep. 2020.
M. Chen, S. Nikolaidis, H. Soh, D. Hsu, and S. Srinivasa, "Planning with Trust for Human-Robot Collaboration," in Proceedings of the 2018 ACM/IEEE International Conference on Human-Robot Interaction—HRI '18. Chicago, IL, USA: ACM Press, 2018, pp. 307-315.
J.-H. Cho, K. Chan, and S. Adali, "A Survey on Trust Modeling," ACM Computing Surveys, vol. 48, No. 2, pp. 28:1-28:40, Oct. 2015.
J. K. Choi and Y. G. Ji, "Investigating the Importance of Trust on Adopting an Autonomous Vehicle," International Journal of Human-Computer Interaction, vol. 31, No. 10, pp. 692-702, Oct. 2015.
P. de Vries, C. Midden, and D. Bouwhuis, "The effects of errors on system trust, self-confidence, and the allocation of control in route planning," International Journal of Human-Computer Studies, vol. 58, No. 6, pp. 719-735, Jun. 2003.
M. Desai, "Modeling Trust to Improve Human-Robot Interaction," Ph.D., University of Massachusetts Lowell, United States—Massachusetts, 2012.
K. Drnec and J. S. Metcalfe, "Paradigm Development for Identifying and Validating Indicators of Trust in Automation in the Operational Environment of Human Automation Integration," in Foundations of Augmented Cognition: Neuroergonomics and Operational Neuroscience, D. D. Schmorrow and C. M. Fidopiastis, Eds. Switzerland: Springer International Publishing, 2016, vol. 9744, pp. 157-167.
N. Du, F. Zhou, E. M. Pulver, D. M. Tilbury, L. P. Robert, A. K. Pradhan, and X. J. Yang, "Predicting driver takeover performance in conditionally automated driving," Accident Analysis & Prevention, vol. 148, p. 105748, Dec. 2020.
E. ElSalamouny, V. Sassone, and M. Nielsen, "HMM-based trust model," in International Workshop on Formal Aspects in Security and Trust. Springer, Berlin, Heidelberg, 2009, pp. 21-35.
M. R. Endsley, "Toward a Theory of Situation Awareness in Dynamic Systems," Human Factors, vol. 37, No. 1, pp. 32-64, Mar. 1995.
M. Ghazizadeh, J. D. Lee, and L. N. Boyle, "Extending the Technology Acceptance Model to assess automation," Cognition, Technology & Work, vol. 14, No. 1, pp. 39-49, Mar. 2012.
C. Gold, R. Happee, and K. Bengler, "Modeling take-over performance in level 3 conditionally automated vehicles," Accident Analysis & Prevention, vol. 116, pp. 3-13, Jul. 2018.
S. Hergeth, L. Lorenz, R. Vilimek, and J. F. Krems, "Keep Your Scanners Peeled: Gaze Behavior as a Measure of Automation Trust During Highly Automated Driving," Human Factors, vol. 58, No. 3, pp. 509-519, May 2016.
K. A. Hoff and M. Bashir, "Trust in automation: Integrating empirical evidence on factors that influence trust," Human Factors: The Journal of the Human Factors and Ergonomics Society, vol. 57, No. 3, pp. 407-434, 2015.
M. Hoogendoorn, S. W. Jaffry, P. P. Van Maanen, and J. Treur, "Modelling biased human trust dynamics," Web Intelligence and Agent Systems, vol. 11, No. 1, pp. 21-40, Aug. 2013.
W. Hu, K. Akash, T. Reid, and N. Jain, "Computational Modeling of the Dynamics of Human Trust During Human-Machine Interactions," IEEE Transactions on Human-Machine Systems, pp. 1-13, 2018.
J.-Y. Jian, A. M. Bisantz, and C. G. Drury, "Foundations for an Empirically Determined Scale of Trust in Automated Systems," International Journal of Cognitive Ergonomics, vol. 4, No. 1, pp. 53-71, 2000.
J. D. Lee and K. A. See, "Trust in automation: Designing for appropriate reliance," Human Factors: The Journal of the Human Factors and Ergonomics Society, vol. 46, No. 1, pp. 50-80, 2004.
S. Li, P. Blythe, W. Guo, and A. Namdeo, "Investigating the effects of age and disengagement in driving on driver's takeover control performance in highly automated vehicles," Transportation Planning and Technology, vol. 42, No. 5, pp. 470-497, Jul. 2019.
J. S. Metcalfe, A. R. Marathe, B. Haynes, V. J. Paul, G. M. Gremillion, K. Drnec, C. Atwater, J. R. Estepp, J. R. Lukos, E. C. Carter, and W. D. Nothwang, "Building a framework to manage trust in automation," in Micro- and Nanotechnology Sensors, Systems, and Applications IX, vol. 10194, May 2017, p. 101941U.
M. E. G. Moe, M. Tavakolifard, and S. J. Knapskog, "Learning trust in dynamic multiagent environments using HMMs," in Proceedings of the 13th Nordic Workshop on Secure IT Systems (NordSec 2008), 2008.
N. Moray and T. Inagaki, "Laboratory studies of trust between humans and machines in automated systems," Transactions of the Institute of Measurement and Control, vol. 21, No. 4-5, pp. 203-211, Oct. 1999.
N. Moray, T. Inagaki, and M. Itoh, "Adaptive automation, trust, and self-confidence in fault management of time-critical tasks," Journal of Experimental Psychology: Applied, vol. 6, No. 1, pp. 44-58, 2000.
B. M. Muir, "Trust between humans and machines, and the design of decision aids," International Journal of Man-Machine Studies, vol. 27, No. 5-6, pp. 527-539, 1987.
B. M. Muir, "Trust in automation: Part I. Theoretical issues in the study of trust and human intervention in automated systems," Ergonomics, vol. 37, No. 11, pp. 1905-1922, 1994.
B. M. Muir and N. Moray, "Trust in automation. Part II. Experimental studies of trust and human intervention in a process control simulation," Ergonomics, vol. 39, No. 3, pp. 429-460, 1996.

(56) References Cited

OTHER PUBLICATIONS

R. Parasuraman and C. D. Wickens, "Humans: Still Vital After All These Years of Automation," Human Factors: The Journal of the Human Factors and Ergonomics Society, vol. 50, No. 3, pp. 511-520, Jun. 2008.

V. L. Pop, A. Shrewsbury, and F. T. Durso, "Individual differences in the calibration of trust in automation," Human Factors, vol. 57, No. 4, pp. 545-556, 2015.

P. Wang, S. Sibi, B. Mok, and W. Ju, "Marionette: Enabling On-Road Wizard-of-Oz Autonomous Driving Studies," in 2017 12th ACM/IEEE International Conference on Human-Robot Interaction, Mar. 2017, pp. 234-243.

S. White, "Techniques for Modeling Drivers' Trust in an Automated Vehicle," Ph.D., University of South Dakota, United States—South Dakota, 2019.

X. Wu, C. Merenda, T. Misu, K. Tanous, C. Suga, and J. L. Gabbard, "Drivers' Attitudes and Perceptions towards A Driving Automation System with Augmented Reality Human-Machine Interfaces," in 2020 IEEE Intelligent Vehicles Symposium (IV), Las Vegas, NV, United States, Jun. 2020, pp. 1-6. (Accepted).

\* cited by examiner

SYSTEM AND METHOD FOR PROVIDING AN RNN-BASED HUMAN TRUST MODEL

CROSS-REFERENCE TO RELATED APPLICATION

This application claims priority to U.S. Provisional Application Ser. No. 63/173,733 filed on Apr. 12, 2021, which is expressly incorporated herein by reference.

BACKGROUND

Individuals are increasingly becoming dependent on automated systems in vehicles ranging from advanced driver-assistance systems (ADAS) like adaptive cruise control and collision avoidance to self-driving automation. Even with significant growth in technological capabilities, human supervision and intervention are still required. Researchers have shown that human trust plays a critical role in these interactions between human and automated systems. On one hand, low levels of trust may lead to disuse of automation and therefore losing the benefits of the automation. On the other hand, over-trust may lead to a human disengaging fully from the driving process.

Trust calibration is necessary for successful interaction between humans and automation. Human trust plays a fundamental role in their interactions with automated systems. However, human trust is an abstract, multidisciplinary concept, with individual disciplines characterizing a different relationship as "trust." To avoid trust miscalibration (i.e., over trust/under trust), there is a need to design human-aware systems that may predict human trust and adapt its behavior accordingly.

For example, during an interaction between a human and a driving automation, the human expects and trusts the automated system to drive safely in an uncertain and risky environment. Quantifying and predicting trust is a challenging task given that it's meaning changes across contexts as well as between different humans. In particular, trust miscalibration, caused by under trust or over trust, leads to disuse of automation.

BRIEF DESCRIPTION

According to one aspect, a computer-implemented method for providing an RN N-based human trust model that includes receiving a plurality of inputs related to an autonomous operation of a vehicle and a driving scene of the vehicle and analyzing the plurality of inputs to determine automation variables and scene variables. Crowd-sourced data associated with surveys that pertain to a driver's self-reported trust and the driver's self-reported reliability with respect to the autonomous operation of the vehicle is collected and analyzed. The computer-implemented method also includes outputting a short-term trust recurrent neural network state that captures an effect of the driver's experience with respect to an instantaneous vehicle maneuver and a long-term trust recurrent neural network state that captures the effect of the driver's experience with respect to the autonomous operation of the vehicle during a traffic scenario based on the automation variables, the scene variables, and the crowd-sourced data. The computer-implemented method further includes predicting a take-over intent of the driver to take over control of the vehicle from an automated operation of the vehicle during the traffic scenario based on the short-term trust recurrent neural network state and the long-term trust recurrent neural network state.

According to another aspect, a system for providing an RNN-based human trust model that includes a memory storing instructions when executed by a processor cause the processor to receive a plurality of inputs related to an autonomous operation of a vehicle and a driving scene of the vehicle and analyze the plurality of inputs to determine automation variables and scene variables. Crowd-sourced data associated with surveys that pertain to a driver's self-reported trust and the driver's self-reported reliability with respect to the autonomous operation of the vehicle is collected and analyzed. The instructions also cause the processor to output a short-term trust recurrent neural network state that captures an effect of the driver's experience with respect to an instantaneous vehicle maneuver and a long-term trust recurrent neural network state that captures the effect of the driver's experience with respect to the autonomous operation of the vehicle during a traffic scenario based on the automation variables, the scene variables, and the crowd-sourced data. The instructions further cause the processor to predict a take-over intent of the driver to take over control of the vehicle from an automated operation of the vehicle during the traffic scenario based on the short-term trust recurrent neural network state and the long-term trust recurrent neural network state.

According to yet another aspect, a non-transitory computer readable storage medium storing instructions that when executed by a computer, which includes a processor perform a method that includes receiving a plurality of inputs related to an autonomous operation of a vehicle and a driving scene of the vehicle and analyzing the plurality of inputs to determine automation variables and scene variables. Crowd-sourced data associated with surveys that pertain to a driver's self-reported trust and the driver's self-reported reliability with respect to the autonomous operation of the vehicle is collected and analyzed. The method also includes outputting a short-term trust recurrent neural network state that captures an effect of the driver's experience with respect to an instantaneous vehicle maneuver and a long-term trust recurrent neural network state that captures the effect of the driver's experience with respect to the autonomous operation of the vehicle during a traffic scenario based on the automation variables, the scene variables, and the crowd-sourced data. The method further includes predicting a take-over intent of the driver to take over control of the vehicle from an automated operation of the vehicle during the traffic scenario based on the short-term trust recurrent neural network state and the long-term trust recurrent neural network state.

DETAILED DESCRIPTION

Figure 1:
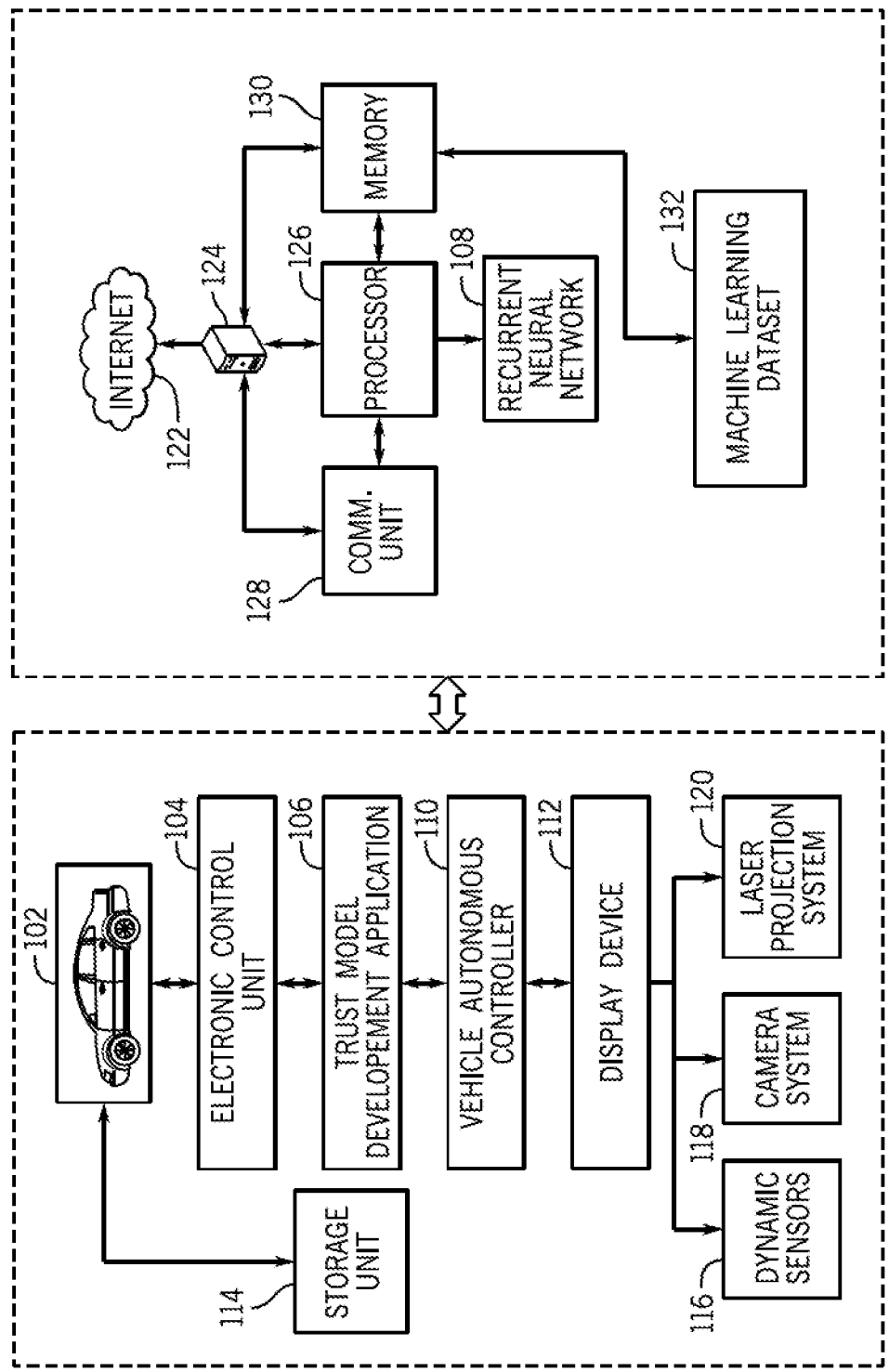
FIG. 1 is a schematic view of an exemplary operating environment for implementing systems and methods for providing a recurrent neural network based human trust model according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary operating environment 100 for implementing systems and methods for providing a recurrent neural network based human trust model according to an exemplary embodiment of the present disclosure. The components of the environment 100, as well as the components of other systems, hardware architectures, and software architectures discussed herein, may be combined, omitted, or organized into different architectures for various embodiments.

Generally, the environment 100 includes a vehicle 102 with an electronic control unit (ECU) 104 that executes one or more applications, operating systems, vehicle system and subsystem user interfaces, among others. The ECU 104 may also execute a trust model development application (trust model application) 106 that is configured to utilize a recurrent neural network (RNN) 108 to model and predict trust and reliability of a driver (not shown) of the vehicle 102 in one or more traffic scenarios. As discussed in more detail below, the trust model application 106 is configured to provide an RNN based human trust model that captures long and short-term trust dynamics with respect to an autonomous operation or semi-autonomous operation of the vehicle 102 in one or more particular traffic related scenarios.

The traffic scenarios may include data that pertains to, one or more traffic maneuvers of the vehicle 102 and one or more traffic configurations of the driving scene of the vehicle 102 that may take place at respective time stamps during the course of operation of the vehicle 102. The one or more traffic maneuvers of the vehicle 102 may include, but may not be limited to, a merging scenario, an acceleration scenario, a braking scenario, a turning scenario, and the like. The one or more traffic configurations of the driving scene of the vehicle 102 may include, but not limited to, a number of lanes of a roadway, a type of roadway intersection, one or more static objects that may be located within the driving scene of the vehicle 102, one or more dynamic objects that may be located within the driving scene of the vehicle 102, and the like.

As discussed below, the trust model application 106 may be configured to utilize various inputs that are related to effects of automation variables and scene variables in particular traffic scenarios. Such inputs maybe provided by systems, sensors, and/or components of the vehicle 102 and/or may be provided in the form of pre-trained crowdsourced survey data that may be provided by individuals based on driving simulations that may be completed by the individuals and/or previous autonomous operation of the vehicle 102.

The trust model application 106 may accordingly provide a trust modeling framework that is configured to utilize the RNN 108 to predict a driver's trust and reliability to the automated or semi-automated operation of the vehicle 102 by specifically predicting the driver's take-over intent in one or more particular traffic related situations (e.g., merging situations). The trust modeling framework provided by the trust model application 106 may provide an understanding of the driver's trust in a real-time autonomous or semi-autonomous driving situation and may utilize the prediction regarding the take-over intent of the driver to provide a level of control to at least one system of the vehicle 102 and/or to control a level of automation transparency. The automation transparency may be provided in the form of one or more augmented reality cues that may be presented to the driver of the vehicle 102 during an autonomous operation or a semi-autonomous operation of the vehicle 102. In particular, the one or more augmented reality cues may indicate information that may be associated with particular autonomous or semi-autonomous functions (e.g., braking, steering, accelerating, etc.) that may be occurring during an autonomous operation or a semi-autonomous operation of the vehicle 102.

The trust model application 106 may provide an improvement to a computer and technology with respect to prediction of a driver's trust on automated driving systems using scene-dependent variables, automation-dependent variables, and driver-dependent variables by modeling effects of these variables on the dynamics of human trust for a real-time driver trust prediction. This improvement may allow for selective utilization of automation controls that may be based on the real-time prediction of the driver's trust with respect to an autonomous or semi-autonomous operation of the vehicle 102 in one or more particular traffic scenarios.

Figure 2:
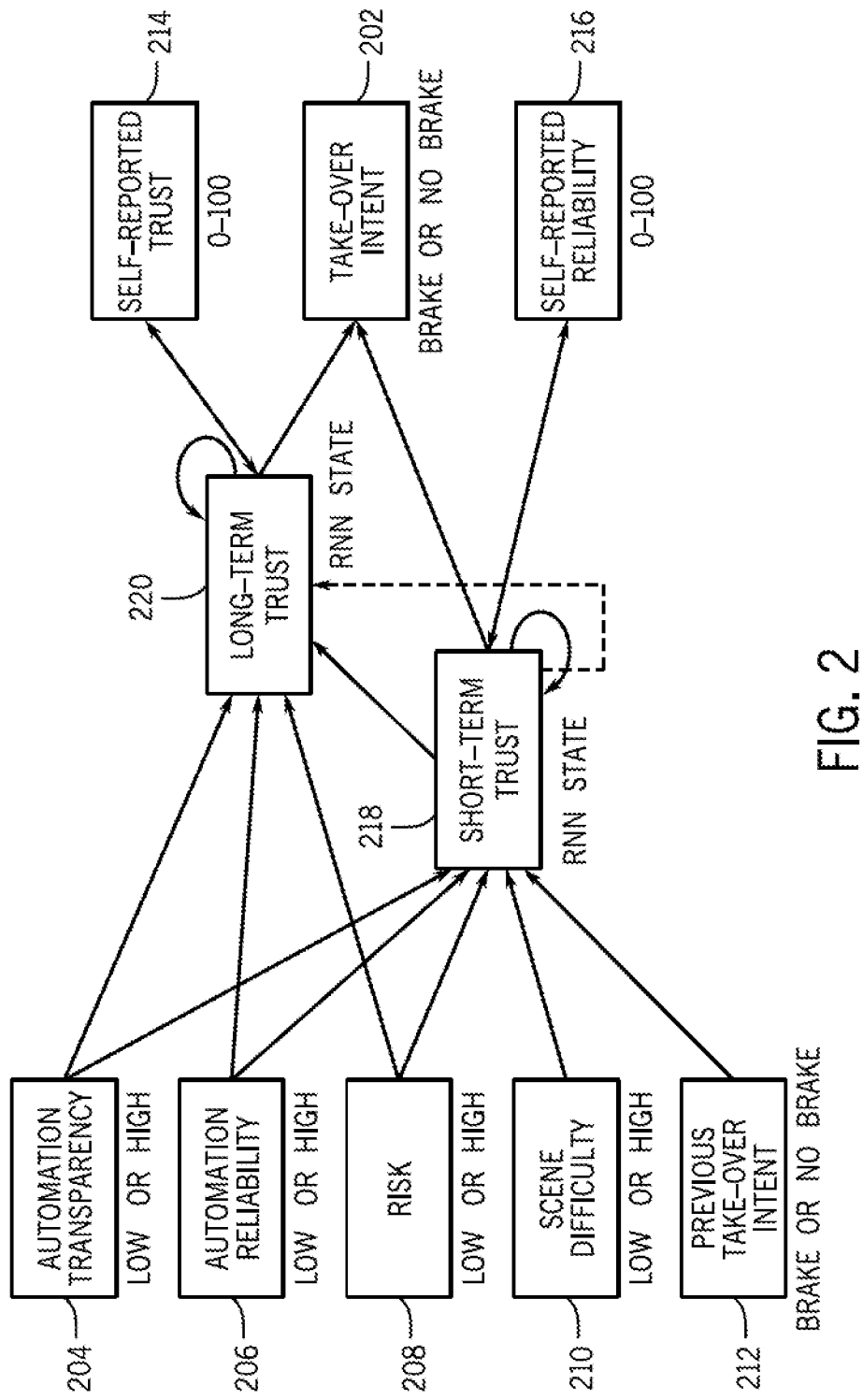
FIG. 2 is an exemplary schematic general overview of a trust model provided by a trust model application according to an exemplary embodiment of the present disclosure.

FIG. 2 is an exemplary schematic general overview of a trust model provided by the trust model application 106 according to an exemplary embodiment of the present disclosure. In an exemplary embodiment, the trust model provided by the trust model application 106 may be determined based on the driver's reliance on the semi-autonomous/autonomous operation of the vehicle 102. The trust model may receive inputs from one or more systems, sensors, and/or components of the vehicle 102 and from crowdsourced survey data that may be completed by the individuals and/or past operation of the vehicle 102.

As discussed below, the trust model may be utilized to populate corresponding data points to a machine learning dataset 132 that may be accessed by the RNN 108. The stored data points of the machine learning dataset 132 may be analyzed and utilized to predict a take-over intent 202 of the driver of the vehicle 102 and determine a level of automation control of one or more systems of the vehicle 102 in a particular traffic scenario in which the vehicle 102 is being autonomously or semi-autonomously operated.

The automation variables and scene variables of the trust model that may be provided by inputs from one or more systems, sensors, and/or components of the vehicle 102 may include a level of automation transparency 204, a level of automation reliability 206, a level of risk 208, a level of scene difficulty 210, and a previous take-over intent 212 of the driver of the vehicle 102. The level of automation transparency 204 that is provided to the driver of the vehicle 102 may be determined by a number of and a description of one or more augmented reality cues that may be presented to the driver of the vehicle 102 during autonomous or semi-autonomous operation of the vehicle 102.

In particular, the level of automation transparency 204 may be dependent on a number of augmented reality cues and a specificity of details associated with automated control of the vehicle 102 that may be presented to the driver of the vehicle 102 as the vehicle 102 is being autonomously or semi-autonomously operated. In one embodiment, the level of automation transparency 204 may be indicated as low or high. For example, if a number of augmented reality cues is lower than a threshold number and/or may not provide many specific details associated with autonomously or semi-autonomously control of the operation of the vehicle 102, the level of automation transparency 204 may be indicated as low. Alternatively, if a number of augmented reality cues is equal to or higher than a threshold number and/or may provide many specific details associated with autonomously or semi-autonomously control of the operation of the vehicle 102, the level of automation transparency 204 may be indicated as high.

The automation variables may also include a level of automation reliability 206 that is associated with a level of the driver's reliability on the autonomous or semi-autonomous operation of the vehicle 102. The level of automation reliability 206 may be associated with a level of manual control or lack of manual control the driver applies during particular traffic scenarios in which the vehicle 102 is being autonomously or semi-autonomously operated. Stated differently, the level of automation reliability 206 may be dependent on the perceived quality of the operation of the vehicle 102 that may be captured by the components of the vehicle 102 and/or the level of manual control that the driver's applies during particular traffic scenarios in which the vehicle 102 is being autonomously or semi-autonomously operated.

In one embodiment, the level of automation reliability 206 may be indicated as low or high. For example, the level of automation reliability 206 may be determined to be low if during autonomous operation, the vehicle 102 aggressively decelerates very close to a traffic intersection stop line (e.g., deceleration starting at <25 meters) which may cause the driver to manually apply the brakes. Alternatively, the level of automation reliability 206 may be determined to be high if during autonomous operation, the vehicle 102 smoothly decelerates towards the stop line (e.g., deceleration starting at >60 meters) which may not cause the driver to manually apply the brakes.

In one or more embodiments, the scene variables may be related to the level of risk 208 that is associated with each particular traffic scenario in which the vehicle 102 is being operated. The level of risk 208 may be based on a classification of dynamic objects that may be located within the driving scene during each particular traffic scenario. In some embodiments, the level of risk 208 may also be based on the location of classified dynamic objects with respect to the location of the vehicle 102 that may indicate a propensity of overlap between the projected path of the vehicle 102 and the projected path of one or more classified dynamic objects.

In one embodiment, the level of risk 208 may be indicated as low risk or high risk. For example, the level of risk 208 may be indicated as low risk where there are only two additional vehicles and no pedestrians that are located at an intersection that the vehicle 102 is crossing. Alternatively, the level of risk 208 may be indicated as high risk where there are multiple vehicles and pedestrians crossing the intersection that the vehicle 102 is intending to cross.

The scene variables may also be related to the level of scene difficulty 210 associated with the driving scene of the vehicle 102 during each particular traffic scenario in which the vehicle 102 is being operated. The level of scene difficulty 210 may be associated with environmental factors that may influence the operation of the vehicle 102. Such environmental factors may include, but may not be limited to, visibility of the environment, precipitation within the environment, roadway ice/slickness, high temperature above a high temperature threshold, and/or low temperature below a low temperature threshold.

In one embodiment, the level of scene difficulty 210 may be indicated as low difficulty or high difficulty. For example, if the visibility is clear based on sunny clear weather, the level of scene difficulty 210 may be indicated as low difficultly. Alternatively, if the visibility is low due to rain and fog, the level of scene difficulty 210 may indicated as high difficultly. In some embodiments, the level of scene difficulty 210 may influence the level of automation reliability 206 associated with a level of manual control or lack of manual control the driver applies during particular traffic scenarios in which the vehicle 102 is being autonomously or semi-autonomously operated.

In one or more embodiments, the previous take-over intent 212 of the driver may be determined as a scene variable that is utilized as an input to predict the (current) take-over intent 202 of the driver. The previous take-over intent 212 may be determined based on the driver's manual take-over to operate the vehicle 102 in a particular traffic scenario in which the vehicle 102 was previously autonomously or semi-autonomously operated that may be similar to a current traffic scenario in which the vehicle 102 is currently being autonomously or semi-autonomously operated. In particular, the previous take-over intent 212 may include data that pertains to a previous traffic scenario that includes one or more matching traffic maneuvers of the vehicle 102 and one or more matching traffic configurations of the driving scene of the vehicle 102 to the current traffic scenario in which the vehicle 102 is currently operating.

The previous take-over intent 212 may be output as data that pertains to a manual driving function. For example, the previous take-over intent may be output as data that pertains to manual braking event or a non-manual braking event that may indicate a previous take-over intent of the driver of the vehicle 102 in a particular traffic scenario in which the vehicle 102 was previously autonomously or semi-autonomously operated that may be similar to a current traffic scenario in which the vehicle 102 is being autonomously or semi-autonomously operated.

As discussed below, a machine learning dataset 132 that may be accessed by the RNN 108 may also be updated with data points that pertain to each of the automation variables and the scene variables. The machine learning dataset 132 may also be updated with crowdsourced survey data that may be provided by individuals (e.g., the driver and/or additional drivers) based on driving simulations and/or past operation of the vehicle 102.

In one embodiment, the crowdsourced survey data may pertain to a self-reported trust 214 that may be provided by individuals in the form of survey values (e.g., 0-100) that may indicate a subjective indication of a level of trust with respect to the autonomous or semi-autonomous operation of a vehicle 102 during operation of the vehicle 102 in a particular traffic scenario. The crowdsourced survey questions may indicate the self-reported trust 214 as an individual's attitude that the autonomously or semi-autonomously operated vehicle will help the individual achieve a goal of driving in a situation that may be characterized by uncertainty and vulnerability.

For example, the crowdsourced survey data may pertain to a self-reported trust 214 that may be provided by individuals in the form of survey values that may indicate a subjective indication with respect to fully trusting, partially trusting, or not trusting the autonomous or semi-autonomous operation of the vehicle 102 as the vehicle 102 crossed an intersection during a past operation of the vehicle 102 or through driving simulations that may be completed by the individuals.

The crowdsourced survey data may also pertain to a self-reported reliability 216 that may be provided by individuals in the form of survey values (e.g., 0-100) that may indicate a subjective reliability that may be associated with a level of manual control or lack of manual control that the driver applies during a particular traffic scenario. Crowdsourced survey questions may indicate the self-reported reliability 216 as a degree to which the autonomously or semi-autonomously operated vehicle performs as the driver expects.

For example, the crowdsourced survey data may pertain to a self-reported reliability 216 that may be provided by individuals in the form of survey values that may indicate a subjective indication with respect to level of manual control that the driver of the vehicle 102 may apply or not apply with respect to taking over control of the operation of the vehicle 102 based on how the driver may have expected the vehicle 102 to be operated as the vehicle 102 crossed an intersection during a past operation of the vehicle 102 or through driving simulations that may be completed by the individuals.

As discussed in more detail, the trust model as determined based on the automation variables and scene variables (from inputs from one or more systems, sensors, and/or components of the vehicle 102) and from crowdsourced survey data (that may be completed by the individuals) may be stored as datapoints upon the machine learning dataset 132. The RNN 108 may be utilized to access the machine learning dataset 132 and analyze the respective datapoints to output RNN states. The RNN states may be outputted as a short-term trust recurrent neural network state (short-term trust RNN state) 218 and a long-term trust recurrent neural network state (long-term trust RNN state) 220. In particular, the short-term trust RNN state 218 may capture the effect of an instantaneous vehicle maneuver (e.g., stopping, merging) that may occur during a particular traffic scenario in which the vehicle 102 is being autonomously or semi-autonomously operated. The long-term trust RNN state 220 may capture the effect of a driver's experience during each one or more particular traffic scenarios in which the vehicle 102 is being autonomously or semi-autonomously operated.

In one or more embodiments, the short-term trust RNN state 218 and the long-term trust RNN state 220 may be modeled as two separate RNN states that each may be modeled as a simple RNN layer of size one. The short-term trust RNN state 218 may have a cumulative affect on the long-term trust RNN state 220. Accordingly, the output of the short-term trust RNN state 218 may be used as an input for the long-term trust RNN state 220. In one embodiment, the take-over intent 202 may be dependent on both the short-term trust RNN state 218 and the long-term trust RNN state 220. In some configurations, the self-reported trust 214 and self-reported reliability 216 for each traffic scenario may be linearly proportional to the RNN states. In other words, the short-term trust RNN state 218 may be represented by the self-reported reliability 216 and the long-term trust RNN state 220 may be represented by the self-reported trust 214.

Referring again to FIG. 1, the components of the vehicle 102 and an externally hosted server infrastructure (external server) 124 will now be discussed. The components of the vehicle 102 may be operably controlled by the ECU 104. In one or more embodiments, the ECU 104 may include a respective microprocessor, one or more application-specific integrated circuit(s) (ASIC), or other similar devices. The ECU 104 may also include respective internal processing memory, an interface circuit, and bus lines for transferring data, sending commands, and communicating with the plurality of components of the vehicle 102.

The ECU 104 may also include a respective communication device (not shown) for sending data internally to components of the vehicle 102 and communicating with externally hosted computing systems (e.g., external to the vehicle 102). In one embodiment, the ECU 104 may be operably connected to a head unit (not shown) of the vehicle 102 that may include and/or may be operably connected to one or more display devices 112 and one or more audio devices (not shown). In one embodiment, the display device(s) 112 may be located within the center of the dashboard of the vehicle 102 or any other location within the vehicle 102.

In some configurations, the display device(s) 112 may be configured as a meter display (not shown) that is disposed behind a steering wheel (not shown) of the vehicle 102. The meter display may include a dashboard display or an instrument cluster display. In additional embodiments, the display device(s) 112 may be alternatively or additionally configured as head up display (HUD) (not shown) that may be projected/disposed upon a windshield (not shown) of the vehicle 102.

In one embodiment, the trust model application 106 may be configured to utilize the display device(s) 112 to provide one or more of the levels of automation transparency that are provided in the form of one or more augmented reality cues that may be presented to driver of the vehicle 102 through the display device(s) 112. In some configurations, the trust model application 106 may also be configured to utilize the audio device(s) to provide audio-based alerts that may be heard within the vehicle 102 to provide one or more levels of automation transparency.

In an exemplary embodiment, the trust model application 106 may utilize data included within the machine learning dataset 132 to process a control policy to thereby operably control the display device(s) 112 to present the one or more augmented reality cues to provide one or more levels of automation transparency that may be presented to the driver of the vehicle 102 during autonomous or semi-autonomous operation of the vehicle 102. As discussed above, the augmented reality cues may indicate information that may be associated with particular autonomous or semi-autonomous functions that may be occurring during an autonomous operation or semi-autonomous operation of the vehicle 102.

As discussed above, the level of automation transparency 204 may be dependent on a number of augmented reality cues and a specificity of details associated with automated control of the vehicle 102 as the vehicle 102 is being autonomously or semi-autonomously operated that may be presented to the driver of the vehicle 102. Accordingly, the trust model application 106 may be configured to continually vary automation transparency with respect to the number of augmented reality cues and the specificity of details associated with automated control of the vehicle 102 that may be provided through the display device(s) 112 based on the control policy.

In an exemplary embodiment, the ECU 104 may additionally communicate with a storage unit 114 to execute one or more applications, operating systems, vehicle systems and subsystem user interfaces, and the like that are stored on the storage unit 114. In one or more embodiments, the storage unit 114 may be accessed by the trust model application 106 to store data, for example, dynamic data associated with the dynamic operation of the vehicle 102, one or more internal images of the vehicle 102, one or more external images of a driving scene of the vehicle 102, one or more sets of LiDAR coordinates (e.g., LiDAR coordinates associated with a position of one or more objects that may be located within the driving scene of the vehicle 102), one or more sets of locational coordinates (e.g., GPS/DGPS coordinates), and/or vehicle dynamic data associated with a dynamic vehicle parameters of the vehicle 102.

In one embodiment, the ECU 104 may be configured to communicate with the vehicle autonomous controller 110 of the vehicle 102 to execute autonomous driving commands to operate the vehicle 102 to autonomously control one or more driving functions of the vehicle 102. The one or more driving functions may include, but may not be limited to, steering, braking, accelerating, merging, turning, coasting, and the like. In one embodiment, the trust model application

106 may utilize data included within the machine learning dataset 132 to communicate with the vehicle autonomous controller 110 to control the level of automation transparency and/or an autonomous operation of one or more driving functions of the vehicle 102.

The trust model application 106 may be configured to communicate with the vehicle autonomous controller 110 to provide a level of automation control of one or more systems of the vehicle 102 in a particular traffic scenario in which the vehicle 102 is being autonomously or semi-autonomously operated to autonomously control one or more driving functions of the vehicle 102 based on the predicted take-over intent 202 of the driver of the vehicle 102. In one embodiment, if the take-over intent 202 is predicted to above a predetermined threshold with respect to one or more functions of the vehicle 102 (e.g., braking, steering, accelerating), the trust model application 106 may be configured to communicate with the vehicle autonomous controller 110 to provide a particular level of automation control of one or more systems of the vehicle 102 that may provide respective functions. If the take-over intent 202 is predicted to be below the predetermined threshold with respect to one or more functions of the vehicle 102, the trust model application 106 may be configured to communicate with the vehicle autonomous controller 110 to provide a particular level of automation control of one or more systems of the vehicle 102 that may provide respective functions.

In some configurations, the trust model application 106 may be configured to communicate with the vehicle autonomous controller 110 to provide a level of automation transparency that may be based on the predicted take-over intent 202. The trust model application 106 may be configured to control the display device(s) 112 to provide respective levels of automation transparency of one or more driving functions of the vehicle 102 to present a particular number of augmented reality cues and a particular specificity of details associated with automated control of particular features of the vehicle 102 that may be based on the predicted take-over intent 202 of the driver of the vehicle 102.

As an illustrative example, the trust model application 106 may communicate with the vehicle autonomous controller 110 to provide a particular level of automated braking, a particular alert, and/or to provide a particular level of automation transparency in the form of augmented reality cues through the display device(s) 112 with respect to the automated braking of the vehicle 102 based on a prediction of the take-over intent 202 to manually brake the vehicle 102 before a traffic intersection.

In one or more embodiments, the ECU 104 may be operably connected to dynamic sensors 116 of the vehicle 102. The dynamic sensors 116 may be configured to output sensed dynamic data associated with particular traffic maneuvers of vehicle 102 as it is being manually operation, semi-autonomously operated, and/or autonomously operated. In one configuration, the dynamic sensors may be configured to receive inputs from one or more vehicle systems, sub-systems, control systems, and the like. The dynamic sensors 116 may be configured to provide vehicle dynamic data to the ECU 104 to be utilized for one or more vehicle systems, sub-systems, control systems, and the like.

The dynamic sensors 116 may include, but may not be limited to, position sensors, heading sensors, speed sensors, steering speed sensors, steering angle sensors, throttle angle sensors, accelerometers, magnetometers, gyroscopes, yaw rate sensors, brake force sensors, wheel speed sensors, wheel turning angle sensors, transmission gear sensors, temperature sensors, RPM sensors, GPS/DGPS sensors, and the like (individual sensors not shown). In one or more embodiments, the dynamic sensors 116 may output sensed dynamic data that may include real-time data associated with particular traffic maneuvers of the vehicle 102 as its being operated.

In one embodiment, the trust model application 106 may be configured to analyze the dynamic data associated with particular traffic maneuvers of the vehicle 102 as its being operated over a predetermined period of time to determine if the driver may take over manual control of the vehicle 102 at particular time stamps when the vehicle 102 is being autonomously or semi-autonomously operated. The dynamic data may also be analyzed to determine a type of take-over control the driver of the vehicle 102 is completing with respect to the autonomous or semi-autonomous operation of the vehicle 102 at the particular time stamps. For example, the dynamic data may be analyzed to determine that the driver has taken over manual control of the vehicle 102 by manually braking the vehicle 102 at a particular time stamp during autonomous operation of the vehicle 102 as it approached a traffic intersection during a rainstorm.

In some embodiments, the trust model application 106 may analyze the dynamic data output by the dynamic sensors at one or more periods of time to determine the level of automation reliability 206 and/or the previous take-over intent 212 of the driver of the vehicle 102. This may occur based on the determination that the driver took over control of the vehicle 102 during one or more particular traffic scenarios during which the vehicle 102 was being autonomously or semi-autonomously operated. In some configurations, the trust model application 106 may analyze the dynamic data in addition to image data provided by a camera system 118 of the vehicle 102 and LiDAR data provided by a laser projection system 120 of the vehicle 102 to determine automation variables associated with the autonomous operation of the vehicle 102 and scene variables associated with the driving scene of the vehicle 102.

In an exemplary embodiment, the ECU 104 may additionally be configured to operably control the camera system 118 of the vehicle 102. The camera system 118 may include one or more cameras (not shown) that are positioned at one or more internal portions of an interior cabin of the vehicle 102 to capture images of the driver of the vehicle 102. The camera system 118 may also include one or more cameras that are positioned at one or more external portions of the vehicle 102 to capture images of the driving scene of the vehicle 102 (e.g., a predetermined area located around (front/side/behind) the vehicle 102.

In particular, the one or more cameras that are positioned at one or more internal portions of an interior cabin of the vehicle 102 may be configured to capture images of the driver's eyes to be analyzed to determine the driver's eye movements within the vehicle 102. The one or more cameras that are positioned at one or more internal portions of an interior cabin of the vehicle 102 may be also be configured to capture images of the driver's body to be analyzed to determine the driver's body movements.

In an exemplary embodiment, the one or more cameras may be configured to capture images of the driver's eyes and send respective image data to the trust model application 106. The trust model application 106 may be configured to analyze the image data associated with one or more images captured for a predetermined period of time to analyze one or more gaze cues to recognize the driver's eye gaze cues over a predetermined period of time.

In an exemplary embodiment, the trust model application 106 may continuously analyze the gaze cues to recognize the driver's eye gaze directions. Specifically, the trust model application 106 may detect the location of the driver's eyes from the image(s) sent by camera system 118 and may specifically evaluate specific areas of the eyes (e.g., iris, pupil, corners of the eye, etc.). The trust model application 106 may utilize virtually any method to perform gaze detection and translate the gaze cues to determine the driver's eye gaze directions.

In one embodiment, the trust model application 106 may analyze the eye gaze directions of the driver based off of a linear model that may consider the evaluation of the specific areas of the eyes of the driver of the vehicle 102. In some embodiments, data associated with gaze detection may be analyzed to determine the automation reliability 206 associated with a level of manual control or lack of manual control the driver applies during particular traffic scenarios in which the vehicle 102 is being autonomously or semi-autonomously operated.

The trust model application 106 may also analyze the body movements of the driver with respect to the movement of the driver's arms, hands, legs, feet, and torso. The trust model application 106 may utilize virtually any method to determine the body movements of the driver. In one embodiment, the trust model application 106 may analyze the driver's body to determine movements based off of a linear model that may consider the evaluation of the specific areas of the body of the driver of the vehicle 102 as the vehicle 102 is being operated. For example, the trust model application 106 may discretize the driver's body movements at any time belonging to one of a plurality of values pertaining to one or more components of the vehicle 102.

In other embodiments, the one or more cameras may be configured as stereoscopic cameras that are configured to capture environmental information with respect to the driving scene of the vehicle 102 in the form three-dimensional images. In one or more configurations, the one or more cameras may be configured to capture one or more first person viewpoint RGB images/videos of the driving scene of the vehicle 102. The camera system 118 may be configured to convert one or more RGB images/videos (e.g., sequences of images) into image data that is communicated to the trust model application 106 to be analyzed.

In an exemplary embodiment, the laser projection system 120 may include one or more LiDAR transceivers (not shown). The one or more LiDAR transceivers of the laser projection system 120 may be disposed at respective external front, rear, and/or side portions of the vehicle 102 including but not limited to different portions of bumpers, body panels, fenders, lighting units, and/or windows/windshield. The one or more respective LiDAR transceivers may include one or more planar sweep lasers that may be configured to oscillate and emit one or more laser beams of ultraviolet, visible, or near infrared light toward the surrounding environment of the vehicle 102. The laser projection system 120 may be configured to receive one or more reflected laser waves based on one or more laser beams emitted by the LiDAR transceivers. The one or more reflected laser waves may be reflected off of one or more objects (e.g., static and/or dynamic objects) that may be located within the driving scene of the vehicle 102. In one configuration, the laser projection system 120 may be configured to output LiDAR data associated to one or more reflected laser waves to the trust model application 106.

In one or more embodiments, the trust model application 106 may be configured to analyze the image data output by the camera system 118 and/or the LiDAR data output by the laser projection system 120 to determine the traffic scenario in which the vehicle 102 is being operated based on the location of one or more dynamic objects that may be located within the driving scene of the vehicle 102, one or more static objects that may be located within the driving scene of the vehicle 102, one or more roads/pathways (e.g., that may include guardrails, curbs, barrier, etc.) that may be located within the driving scene of the vehicle 102, one or more lanes that may be located upon one or more roads/pathways that may be located within the driving scene of the vehicle 102, and the like. As discussed below, the trust model application 106 may analyze the image data and/or the LiDAR data to determine the level of risk 208 and the level of scene difficulty 210 with respect to the autonomous operation or the semi-autonomous operation of the vehicle 102 during particular traffic scenarios.

In one or more embodiments, the ECU 104 of the vehicle 102 may be operably connected to a communication unit (not shown) that may be operably controlled by the ECU 104. The communication unit may be part of a telematics control unit (not shown) of the vehicle 102 and may be operably connected to one or more transceivers (not shown) of the vehicle 102. The communication unit may be configured to communicate through an internet cloud 122 through one or more wireless communication signals that may include, but may not be limited to Bluetooth® signals, Wi-Fi signals, ZigBee signals, Wi-Max signals, and the like. The communication unit may be configured to communicate through the internet cloud 122 to send and receive communication signals to and from the external server 124 that may host the RNN 108.

In one embodiment, the trust model application 106 may be configured to utilize the RNN 108 to execute a machine learning/deep learning probabilistic framework to output the trust model to capture the effect of short-term situational trust factors and longer-term learned trust factors along with dispositional factors. A loss function is minimized and may include equally weighted sum of binary cross-entropy for take-over intent and mean-squared errors for self-reported trust and reliability. In one configuration, the RNN 108 may be configured to split training data points stored within the machine learning dataset 132 in an 80-20 training-validation split and validation data may be used to identify an optical number of epochs for early stopping. To maximize the use of training data, training data for each aspect of the training model is used to train the model for the identified number of epochs.

In one embodiment, the RNN 108 may be configured to identify an optimal combination of inputs for each RNN state. The RNN 108 may be configured to train models based on data points that are updated to the machine learning dataset 132 that pertain to automation variables and scene variables of particular traffic scenarios as provided systems, sensors, and/or components of the vehicle 102, and/or crowdsourced survey data that may be provided from surveys conducted by individuals. In one configuration, the RNN 108 may be configured to train models with all combinations of inputs to identify a model that minimizes a 4-fold cross-validation (CV) loss. Accordingly, the trust model may be provided and the RNN 108 may be utilized by the trust model application 106 to predict the take-over intent 202 and determine a level of automation control of one or more systems of the vehicle 102 in a particular traffic scenario in which the vehicle 102 is (currently) being autonomously operated or semi-autonomously operated.

With continued reference to the external server 124, the processor 126 may be operably connected to a memory 130. The memory 130 may store one or more operating systems, applications, associated operating system data, application data, executable data, and the like. In one or more embodiments, the machine learning dataset 132 may be configured as a dataset that includes one or more fields that are populated with data points that are associated with the automation variables, scene variables, and pre-trained crowdsourced survey data. The one or more fields may also be populated with traffic scenario data that pertains to the traffic scenario in which the vehicle 102 is being manually, autonomously, or semi-autonomously operated at a particular time stamp.

In particular, the one or more fields may include data points that are associated with driving scene data that pertain to the driving scene of the vehicle 102 during various traffic scenarios, data that is associated with one or more traffic maneuvers of the vehicle 102, and data that is associated with one or more traffic configurations of the driving scene of the vehicle 102 that may take place at respective time stamps during the course of operation of the vehicle 102. The one or more fields may also include data points that pertain to the level of automation transparency 204, the level of automation reliability 206, the level of risk 208, the level of scene difficulty 210, and the previous take-over intent 212 associated with respective traffic scenarios. The one or more fields may also include data points that pertain to self-reported trust 214 and self-reported reliability 216 that is based on the crowdsourced survey data. As discussed below, the RNN 108 may access and analyze the machine learning dataset 132 to provide the short-term trust RNN state 218 and the long-term trust RNN state 220 to thereby predict the take-over intent 202 of the driver of the vehicle 102 in one or more particular traffic scenarios.

II. The Trust Model Development Application and Related Methods

The components of the trust model application 106 will now be described according to an exemplary embodiment and with reference to FIG. 1. In an exemplary embodiment, the trust model application 106 may be stored on the memory 130 and executed by the processor 126 of the external server 124. In another embodiment, the trust model application 106 may be stored on the storage unit 114 of the vehicle 102 and may be executed by the ECU 104 and/or the head unit of the vehicle 102.

Figure 3:
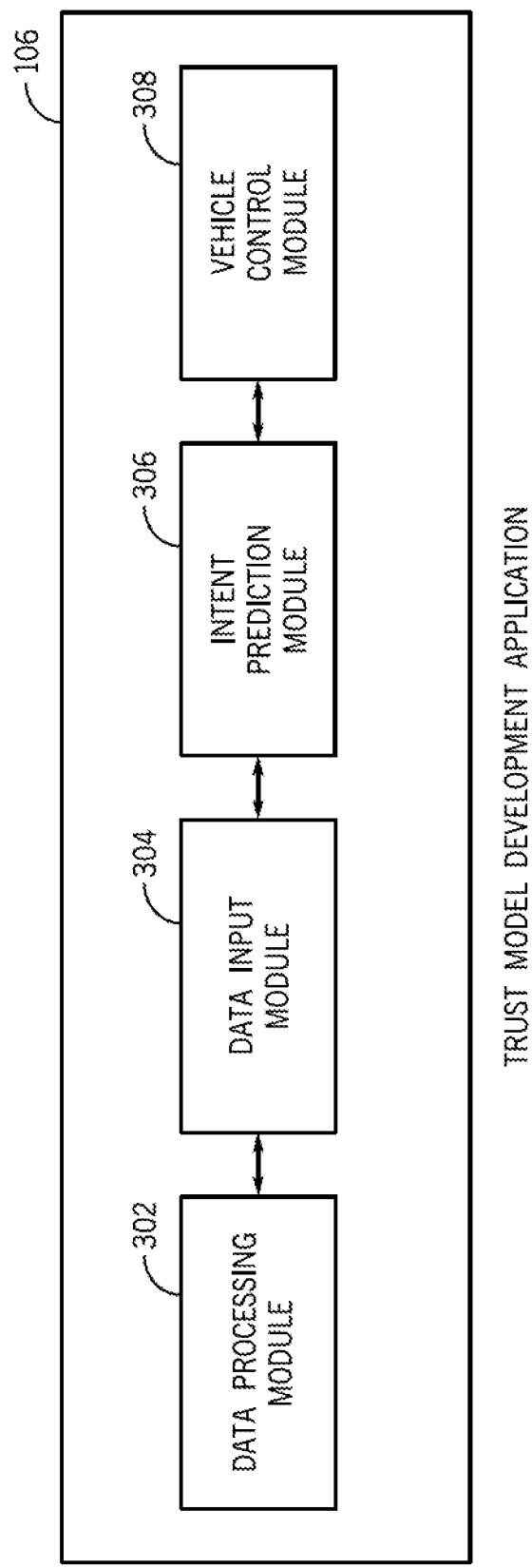
FIG. 3 is a schematic overview of a plurality of modules of the trust model application according to an exemplary embodiment of the present disclosure.

The general functionality of the trust model application 106 will now be discussed. FIG. 3 is a schematic overview of a plurality of modules 302-308 of the trust model application 106 according to an exemplary embodiment of the present disclosure. In an exemplary embodiment, the trust model application 106 may include a data processing module 302, a data input module 304, an intent prediction module 306, and a vehicle control module 308. However, it is to be appreciated that the trust model application 106 may include one or more additional modules and/or sub-modules that are included in addition to the modules 302-308. Methods and examples describing process steps that are executed by the modules 302-308 of the trust model application 106 will now be described in more detail.

Figure 4:
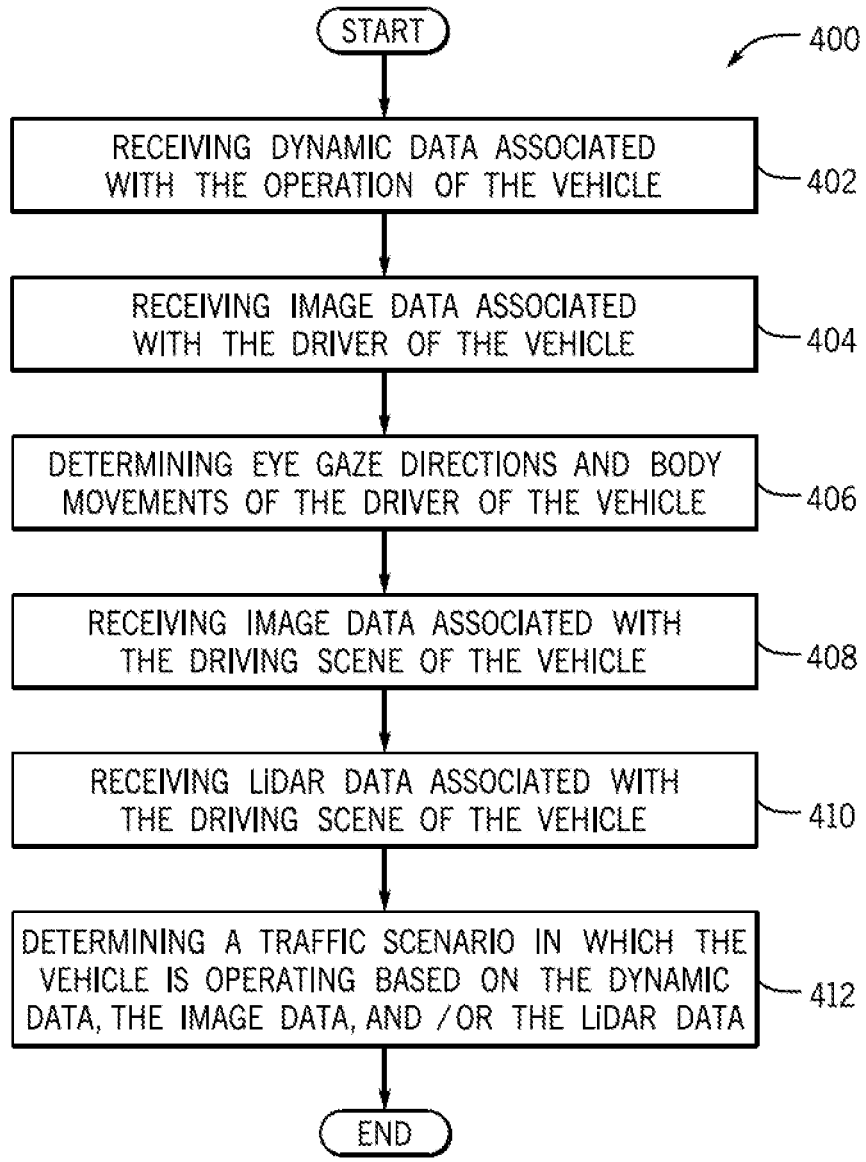
FIG. 4 is a process flow diagram of a method for receiving a plurality of inputs related to automation variables associated with an autonomous operation of a vehicle and scene variables associated with a driving scene of the vehicle according to an exemplary embodiment of the present disclosure.

FIG. 4 is a process flow diagram of a method 400 for receiving a plurality of inputs related to automation variables associated with the autonomous operation of the vehicle 102 and scene variables associated with a driving scene of the vehicle 102 according to an exemplary embodiment of the present disclosure. FIG. 4 will be described with reference to the components of FIG. 1-FIG. 3, through it is to be appreciated that the method 400 of FIG. 4 may be used with other systems/components. In an exemplary embodiment, the trust model application 106 may execute the method 400 during a semi-autonomous operating mode or an autonomous operating mode of the vehicle 102 (e.g., hands-off driving scenario).

Within the semi-autonomous operating mode or the autonomous operating mode, steering, acceleration, and braking may be autonomously controlled by the vehicle autonomous controller 110 of the vehicle 102. However, the driver may be able to take over control to manually drive the vehicle 102 such that the driver may take over control of the steering, acceleration, and/or braking of the vehicle 102 in one or more circumstances as deemed by the driver.

The method 400 may begin at block 402, wherein the method 400 may include receiving dynamic data associated with the operation of the vehicle 102. In an exemplary embodiment, the data processing module 302 may be configured to communicate with the dynamic sensors 116 of the vehicle 102 to determine when the vehicle 102 is being semi-autonomously operated and/or autonomously operated based on electronic commands that are sent to one or more components of the vehicle 102 from the vehicle autonomous controller 110. Upon determining that the vehicle 102 is being semi-autonomously or autonomously operated, the data processing module 302 may be configured to analyze the dynamic data associated with particular traffic maneuvers of the vehicle 102 over a predetermined period of time to determine if the driver may take over control of the vehicle 102 at particular time stamps when the vehicle 102 is being autonomously or semi-autonomously operated. The dynamic data may also be analyzed to determine what type of take-over control the driver of the vehicle 102 is completing with respect to the autonomous or semi-autonomous operation of the vehicle 102.

Upon determining the take over control of the vehicle 102 and the type of take-over control at particular time stamps, the data processing module 302 may be configured to communicate respective dynamic data to the data input module 304 of the trust model application 106. In one embodiment, the data input module 304 may analyze the dynamic data output by the dynamic sensors to determine the level of automation reliability 206 and/or the previous take-over intent 212 of the driver of the vehicle 102 based on the determination that the driver took over control of the vehicle 102 during one or more traffic scenarios during which the vehicle 102 was being autonomously or semi-autonomously operated.

The method 400 may proceed to block 404, wherein the method 400 may include receiving image data associated with the driver of the vehicle 102. In one embodiment, upon determining that the vehicle 102 is being semi-autonomously or autonomously operated based on the analysis of dynamic data provided by the dynamic sensors 116 of the vehicle 102, the data processing module 302 may be configured to communicate with the camera system 118 of the vehicle 102 to receive image data. In particular, the data processing module 302 may receive image data that may be associated with images that are captured of the driver's eyes and/or portions of the driver's body as the vehicle 102 is being semi-autonomously operated and/or autonomously operated.

The method 400 may proceed to block 406, wherein the method 400 may include determining eye gaze directions and body movements of the driver of the vehicle 102. In an exemplary embodiment, upon receiving the image data associated with images that are captured of the driver's eyes and/or portions of the driver's body as the vehicle 102 is being semi-autonomously or autonomously operated, the data processing module 302 may be configured to analyze the image data associated with one or more images captured for a predetermined period of time to analyze one or more gaze cues and body movements that may indicate when the driver takes over control or intends to take over control of the vehicle 102 during semi-autonomous and/or autonomous operation of the vehicle 102.

In particular, the data processing module 302 may continuously analyze eye gaze cues to recognize the driver's eye gaze directions for a predetermined period of time. The data processing module 302 may thereby detect the location of the driver's eyes from the image(s) sent by camera system 118 and may specifically evaluate specific areas of the eyes to determine the driver's eye gaze directions. The data processing module 302 may utilize virtually any method to translate the gaze cues to determine the driver's eye gaze directions. In one embodiment, the data processing module 302 may analyze the driver's eye gaze directions based off of a linear model that may consider the evaluation of the specific areas of the eyes of the driver of the vehicle 102 as the vehicle 102 is being operated.

The data processing module 302 may thereby determine eye gaze directions of the driver of the vehicle 102 based on the gaze (viewpoint) of the driver and may output respective data. For example, the data processing module 302 may discretize the driver's gaze direction at any time belonging to one of a plurality of values pertaining to the driver's eye gaze direction that may include, but may not be limited to, the driver's eye gaze direction toward the road on which the vehicle 102 is traveling, the driver's eye gaze direction toward a dynamic object that may be located within the driving scene of the vehicle 102, the driver's eye gaze direction toward a static object that may be located within the driving scene of the vehicle 102, the driver's eye gaze direction towards road markings, road signage, traffic infrastructure, and the like that may be located within the driving scene, and the driver's eye gaze direction towards portions of the interior of the vehicle 102.

The data processing module 302 may thereby determine eye gaze directions of the driver of the vehicle 102 based on the gaze (viewpoint) of the driver with respect to one or more internal components of the vehicle 102 and may output respective data. For example, the data processing module 302 may discretize the driver's gaze direction at any time belonging to one of a plurality of values pertaining to the driver's eye gaze direction that may include, but may not be limited to, the driver's eye gaze direction toward a steering wheel of the vehicle 102, a gear shifter of the vehicle 102, a speedometer of the vehicle 102, the display device(s) 112 of the vehicle 102, and the like.

The data processing module 302 may also analyze body movements of the driver with respect to the movement of the driver's arms, hands, legs, feet, and torso. The data processing module 302 may utilize virtually any method to determine the body movements of the driver. In one embodiment, the data processing module 302 may analyze the driver's body to determine movements based off of a linear model that may consider the evaluation of the specific areas of the body driver of the vehicle 102 as the vehicle 102 is being operated. For example, the data processing module 302 may discretize the driver's body movements at any time belonging to one of a plurality of values pertaining to one or more components of the vehicle 102, including, but not limited to, the steering wheel, the accelerator, the brake pedal, the gear shifter, one or more input switches that may be inputted to enable or disable autonomous or semi-autonomous operation of the vehicle 102, one or more input switches that may be inputted to enable or disable one or more vehicle safety systems (e.g., tracking control system), and the like.

In one or more embodiments, upon determining the eye gaze directions and the body movements of the driver of the vehicle 102 during semi-autonomous and/or autonomous operation of the vehicle 102, the data processing module 302 may communicate gaze-movement data to the data input module 304 of the trust model application 106. The gaze-movement data may include information pertaining to the eye gaze directions and the body movements of the driver of the vehicle 102 and may be analyzed by the data input module 304 to determine the level of automation reliability 206 and/or the previous take-over intent 212 of the driver of the vehicle 102 during one or more particular traffic scenarios.

The method 400 may proceed to block 408, wherein the method 400 may include receiving image data associated with the driving scene of the vehicle 102. In one embodiment, the data processing module 302 may be configured to communicate with the camera system 118 of the vehicle 102 to receive image data associated with the driving scene of the vehicle 102. As discussed above, the image data associated with the driving scene of the vehicle 102 may be captured by one or more external cameras of the camera system 118 of the vehicle 102.

In an exemplary embodiment, upon receiving the image data, the data processing module 302 may be configured to analyze the image data that pertains to the driving scene of the vehicle 102 using image logic (e.g., computer-executed instructions stored upon the storage unit 114 and/or the memory 130) to determine configuration of the surrounding environment of the vehicle 102. The driving scene may include one or more dynamic objects that may be located within the surrounding environment of the vehicle 102, one or more static objects that may be located within the surrounding environment of the vehicle 102, one or more roads/pathways that may be located within the surrounding environment of the vehicle 102, one or more lanes that may be located upon one or more roads/pathways that may be located within the surrounding environment of the vehicle 102, and the like.

In one configuration, the data processing module 302 may evaluate the image data using the image logic to classify dynamic objects that may be located within the driving scene. In particular, the data processing module 302 may evaluate the image logic to classify the dynamic objects that are detected to be located within the driving scene as vehicles or pedestrians. Upon classifying the dynamic objects, the data processing module 302 may communicate the image data and classifications of image data to the data input module 304. As discussed below, the image data and classification of dynamic objects that may be located within the driving scene may be analyzed by the data input module 304 to determine the level of risk 208 and/or the level of scene difficultly 210 during one or more traffic scenarios.

With continued reference to the method 400 of FIG. 4, the method 400 may proceed to block 410, wherein the method 400 may include receiving LiDAR data associated with the driving scene of the vehicle 102. As discussed above, the laser projection system 120 may be configured to receive one or more reflected laser waves based on one or more laser beams emitted by the LiDAR transceivers of the laser projection system 120. The one or more reflected laser waves may be reflected off of one or more objects (e.g., static and/or dynamic objects) that may be located within the driving scene of the vehicle 102.

In one configuration, the laser projection system 120 may be configured to output LiDAR data associated to one or more reflected laser waves to the data processing module 302. The data processing module 302 may be configured to analyze the LiDAR data that pertains to the driving scene of the vehicle 102 to determine the traffic scenario in which the vehicle 102 is being operated based on the location of one or more dynamic objects that may be located within the driving scene of the vehicle 102, one or more static objects that may be located within the driving scene of the vehicle 102, one or more roads/pathways (e.g., that may include guardrails) that may be located within the driving scene of the vehicle 102, one or more lanes that may be located upon one or more roads/pathways that may be located within the driving scene of the vehicle 102, and the like.

In one configuration, the data processing module 302 may evaluate the LiDAR data using the LiDAR logic to classify dynamic objects that may be located within the driving scene. In particular, the data processing module 302 may evaluate the LiDAR logic to classify the dynamic objects that are detected to be located within the driving scene as vehicles or pedestrians. Upon classifying the dynamic objects, the data processing module 302 may communicate the LiDAR data and classifications of image data to the data input module 304. As discussed below, the LiDAR data and classification of dynamic objects that may be located within the driving scene may be analyzed by the data input module 304 to determine the level of risk 208 and/or the level of scene difficultly 210 during one or more traffic scenarios.

The method 400 may proceed to block 412, wherein the method 400 may include determining a traffic scenario in which the vehicle 102 is operating based on the dynamic data, the image data, and/or the LiDAR data. In one embodiment, the data processing module 302 may be configured to aggregate data associated with traffic maneuvers of the vehicle 102 at a particular time stamp based on the dynamic data provided by the dynamic sensors 116 with image data provided by the camera system 118, LiDAR data provided by the laser projection system 120, and the classification of objects within the driving scene based on execution of image logic and/or LiDAR logic. The aggregation of the dynamic data, image data, LiDAR data, and the classification of objects within the driving scene may be completed to output traffic scenario data that pertains to the traffic scenario in which the vehicle 102 is being manually, autonomously, or semi-autonomously operated at a particular time stamp.

The traffic scenario data may include electronic data points that include information that pertains to one or more traffic maneuvers of the vehicle 102 and one or more traffic configurations of the driving scene of the vehicle 102 that may take place at the respective time stamp. In one embodiment, upon outputting the traffic scenario data that pertains to the traffic scenario in which the vehicle 102 is being operated, the data processing module 302 may communicate the traffic scenario data to the data input module 304. In one configuration, the data input module 304 may be configured to access the machine learning dataset 132 stored upon the memory 130 of the external server 124 to populate a field of the dataset 132 with the traffic scenario data to be analyzed at one or more points of time. The field of the dataset 132 may additionally be populated with a time stamp that is associated with the traffic scenario data based on the timestamp at which the traffic scenario occurs.

Figure 5:
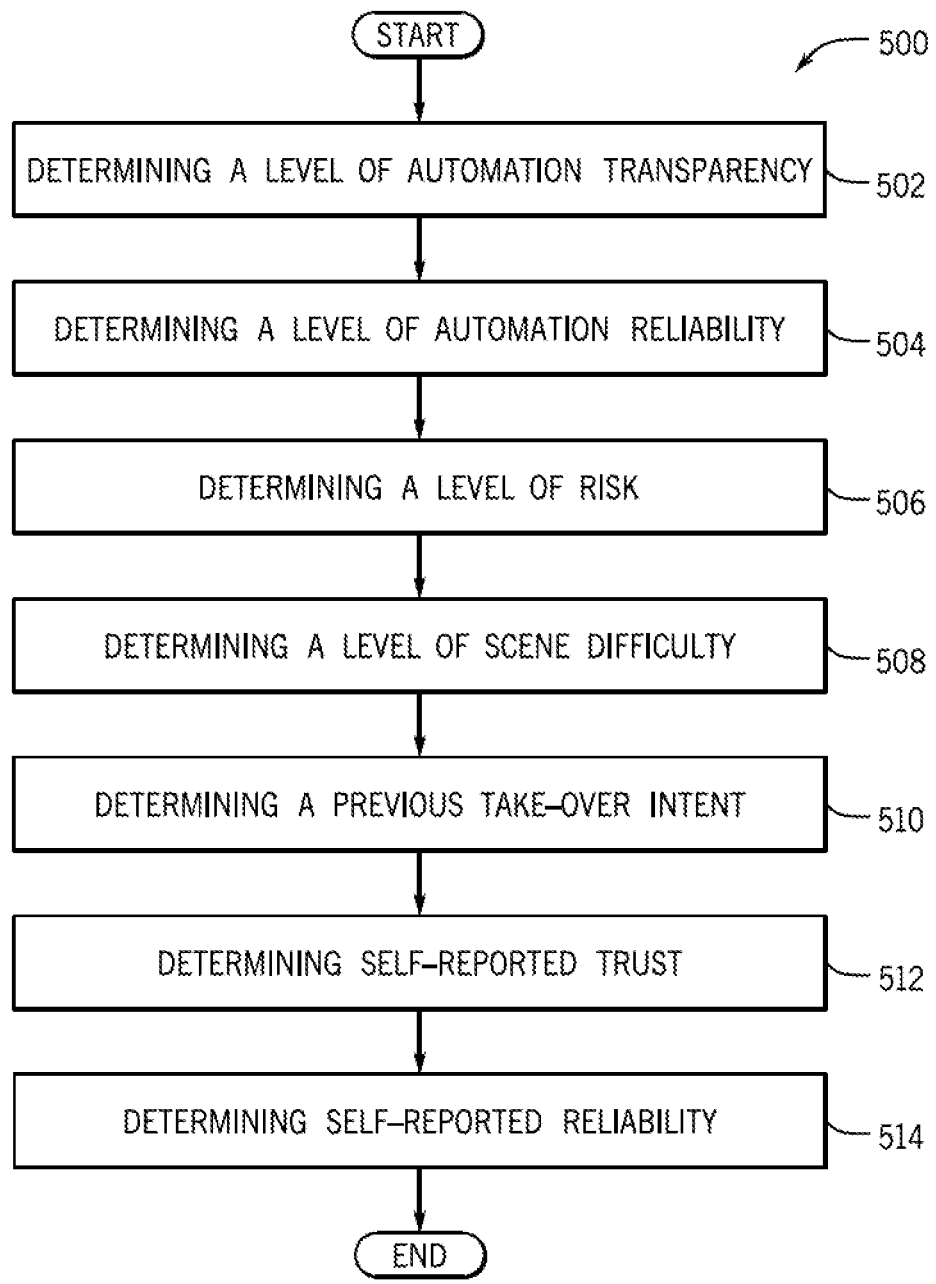
FIG. 5 is a process flow diagram of a method for determining automation variables, scene variables, and crowd-sourced data according to an exemplary embodiment of the present disclosure.

FIG. 5 is a process flow diagram of a method 500 for determining automation variables, scene variables, and crowdsourced data according to an exemplary embodiment of the present disclosure. FIG. 5 will be described with reference to the components of FIG. 1-FIG. 3, through it is to be appreciated that the method 500 of FIG. 5 may be used with other systems/components. The method 500 may begin at block 502, wherein the method 500 may include determining a level of automation transparency 204.

In an exemplary embodiment, the trust model application 106 may utilize data (e.g., pre-trained data, previously stored data) included within the machine learning dataset 132 to process a control policy to thereby operably control the display device(s) 112 to present the one or more augmented reality cues to provide one or more levels of automation transparency that may be presented to the driver of the vehicle 102 during autonomous or semi-autonomous operation of the vehicle 102. The augmented reality cues may indicate information that may be associated with particular autonomous or semi-autonomous functions that may be occurring during the particular traffic scenario.

In one embodiment, the data input module 304 may determine the level of automation transparency 204 based on a number of augmented reality cues and a specificity of details associated with automated control of the vehicle 102 that is presented to the driver through the display device(s) 112 as the vehicle 102 is being autonomously or semi-autonomously operated during the particular traffic scenario. In one embodiment, the level of automation transparency 204 may be indicated as low or high based on a comparison to a threshold number of augmented reality cues and the specificity of details associated with the augmented reality cues with respect to the autonomous operation and/or semi-autonomous operation of the vehicle 102.

Upon determining the level of automation transparency 204 during the particular traffic scenario, the data input module 304 may be configured to access the machine learning dataset 132 to populate the field of the dataset 132 that was previously populated with the traffic scenario data that pertains to the traffic scenario at the particular time stamp (as discussed with respect to block 412 of the method 400). In particular, the data input module 304 may be configured to populate the field of the dataset 132 that includes the traffic scenario data with the level of automation transparency 204 (e.g., low or high) during the particular traffic scenario as determined by the data input module 304.

The method 500 may proceed to block 504, wherein the method 500 may include determining the level of automation reliability 206. In one embodiment, the data input module 304 may analyze dynamic data provided by the dynamic sensors 116 of the vehicle 102 at the particular timestamp to determine the level of automation reliability 206 associated with a level of manual control (e.g., high, low, or none) the driver applies during particular traffic scenarios in which the vehicle 102 is being autonomously or semi-autonomously operated. In another embodiment, the data input module 304 may additionally or alternatively analyze gaze-movement data associated with the gaze direction and body movements of the driver of the vehicle 102 to determine the automation reliability 206 associated with a level of manual control the driver applies during the particular traffic scenario in which the vehicle 102 is being autonomously or semi-autonomously operated.

Accordingly, the data input module 304 may output the level of automation reliability 206 as the level of the driver's reliability on the autonomous or semi-autonomous operation of the vehicle 102 during the particular traffic scenario. The level of automation reliability 206 may be associated with a level of manual control or lack of manual control the driver applies during particular traffic scenarios in which the vehicle 102 is being autonomously or semi-autonomously operated. The level of automation reliability 206 may be dependent on the perceived quality of the operation of the vehicle 102 that may be captured by the components of the vehicle 102 and/or the level of manual control that the driver applies during particular traffic scenarios in which the vehicle 102 is being autonomously or semi-autonomously operated. In one embodiment, the level of automation reliability 206 may be indicated as low or high.

Upon determining the level of automation reliability 206 during the particular traffic scenario, the data input module 304 may be configured to access the machine learning dataset 132 to populate the field of the dataset 132 that was previously populated with the traffic scenario data that pertains to the traffic scenario at the particular time stamp (as discussed with respect to block 412 of the method 400). In particular, the data input module 304 may be configured to populate the field of the dataset 132 that includes the traffic scenario data with the level of automation reliability 206 (e.g., low or high) during the particular traffic scenario as determined by the data input module 304.

The method 500 may proceed to block 506, wherein the method 500 may include determining a level of risk 208. In one embodiment, the data input module 304 may analyze image data provided by the camera system 118 with respect to the classification of dynamic objects that may be located within the driving scene during the particular traffic scenario. In an alternate embodiment, the data input module 304 may additionally or alternatively analyze LiDAR data provided by the laser projection system 120 with respect to the classification of dynamic objects that may be located within the driving scene during the particular traffic scenario.

Accordingly, the data input module 304 may output the level of risk 208 that is associated with the particular traffic scenario in which the vehicle 102 is being operated. The level of risk 208 may be based on the classification of dynamic objects that may be located within the driving scene during each particular traffic scenario. The level of risk 208 may also be based on the location of classified dynamic objects with respect to the location of the vehicle 102 that may indicate a propensity of overlap between the projected path of the vehicle 102 and the projected path of one or more classified dynamic objects. In one embodiment, the level of risk 208 may be indicated as low risk or high risk.

Upon determining the level of risk 208 during the particular traffic scenario, the data input module 304 may be configured to access the machine learning dataset 132 to populate the field of the dataset 132 that was previously populated with the traffic scenario data that pertains to the traffic scenario at the particular time stamp (as discussed with respect to block 412 of the method 400). In particular, the data input module 304 may be configured to populate the field of the dataset 132 that includes the traffic scenario data that pertains to the traffic scenario at the particular time stamp with the level of automation risk 208 (e.g., low or high) during the particular traffic scenario that pertains to one or more traffic maneuvers of the vehicle 102 and one or more traffic configurations of the driving scene of the vehicle 102 as determined by the data input module 304.

With continued reference to FIG. 5, upon determining the level of risk, the method 500 may proceed to block 508, wherein the method 500 may include determining a level of scene difficulty 210. In one embodiment, the data input module 304 may analyze image data provided by the camera system 118 that pertains to the driving scene of the vehicle 102. In an alternate embodiment, the data input module 304 may additionally or alternatively analyze LiDAR data provided by the laser projection system 120 that pertains to the driving scene of the vehicle 102.

Accordingly, the data input module 304 may output the level of scene difficulty 210 that is associated with the particular traffic scenario in which the vehicle 102 is being operated. The level of scene difficulty 210 may be associated with environmental factors that may influence the operation of the vehicle 102. Such environmental factors may include, but may not be limited to, visibility of the environment, precipitation within the environment, roadway ice/slickness, high temperature above a high temperature threshold, and/or low temperature below a low temperature threshold. In one embodiment, the level of scene difficulty 210 may be indicated as low difficulty or high difficulty.

Upon determining the level of scene difficulty 210 during the particular traffic scenario, the data input module 304 may be configured to access the machine learning dataset 132 to populate the field of the dataset 132 that was previously populated with the traffic scenario data that pertains to the traffic scenario at the particular time stamp (as discussed with respect to block 412 of the method 400). In particular, the data input module 304 may be configured to populate the field of the dataset 132 that includes the traffic scenario data with the level of scene difficulty (e.g., low or high) during the particular traffic scenario as determined by the data input module 304.

The method 500 may proceed to block 510, wherein the method 500 may include determining a previous take-over intent 212. In one embodiment, the data input module 304 may analyze dynamic data provided by the dynamic sensors 116 of the vehicle 102 at the particular timestamp to determine the previous take-over intent 212 of the driver in situations that are similar to the particular traffic scenario in which the vehicle 102 is being autonomously or semi-autonomously operated. In another embodiment, the data input module 304 may additionally or alternatively analyze gaze-movement data associated with the gaze direction and body movements of the driver of the vehicle 102 to determine previous take-over intent 212 of the driver.

The previous take-over intent 212 of the driver may be determined as an input to predict the (current) take-over intent 202 of the driver that occurs in a similar traffic scenario to the particular traffic scenario captured at a past timestamp. The previous take-over intent 212 may be determined based on the driver's manual take-over to operate the vehicle 102 in prior traffic scenario in which the vehicle 102 was autonomously or semi-autonomously operated that may be similar to a current traffic scenario in which the vehicle 102 is being autonomously or semi-autonomously operated.

In one configuration, as the vehicle 102 is being autonomously or semi-autonomously operated within the particular traffic scenario, the driver's manual take-over to operate the vehicle 102 may be determined based on the dynamic data and/or gaze-movement data. For example, the previous take-over intent may be captured either as the driver's manual take-over to brake the vehicle 102 to stop the vehicle 102 at a traffic intersection or the driver allowing the vehicle 102 to be autonomously controlled to autonomously stop at the traffic intersection (i.e., an intent to not take-over operation of the vehicle 102).

The data points may be uploaded to a machine learning dataset 132 that may be accessed by the RNN 108. As discussed below, the stored data points of the machine learning dataset 132 may be analyzed and utilized to in real-time to predict the take-over intent 202 of the driver of the vehicle 102 and determine a level of automation control of one or more systems of the vehicle 102 in a particular traffic scenario in which the vehicle 102 is being autonomously or semi-autonomously operated.

Upon determining the previous take-over intent 212 that occurs during the particular traffic scenario, the data input module 304 may be configured to access the machine learning dataset 132 to populate the field of the dataset 132 that was previously populated with the traffic scenario data that pertains to the traffic scenario at the particular time stamp (as discussed with respect to block 412 of the method 400). In particular, the data input module 304 may be configured to populate the field of the dataset 132 that includes the traffic scenario data with the previous take-over intent (e.g., intent to manually operate the vehicle 102, intent to not manually operate the vehicle 102 and allow autonomous operation of the vehicle 102) during a prior traffic scenario that is similar to the current traffic scenario as determined by the data input module 304.

The method 500 may proceed to block 512, wherein the method 500 may include determining self-reported trust. In one embodiment, crowdsourced data may be inputted from one or more external computing sources to the data input module 304. The crowdsourced data may be associated with survey data that may be provided by individuals based on driving simulations or previous operation of the vehicle 102 that may occur at one or more traffic scenarios that are similar to the particular traffic scenario (determined at block 412 of the method 400) (e.g., intersection with vehicles and pedestrians).

In one embodiment, upon receiving the crowdsourced data, the data input module 304 may be configured to analyze the crowdsourced data to the determine a self-reported trust 214 that may be associated with the semi-autonomous or autonomous operation of the vehicle 102 within the particular traffic scenario. The self-reported trust 214 that may be provided by individuals in the form of survey values (e.g., 0-100) may indicate a subjective indication of a level of trust with respect to the autonomous or semi-autonomous operation of a vehicle 102 during operation of the vehicle 102 within the particular traffic scenario.

Upon determining the self-reported trust 214 with respect to the autonomous or semi-autonomous operation of a vehicle 102 within the particular traffic scenario, the data input module 304 may be configured to access the machine learning dataset 132 to populate the field of the dataset 132 that was previously populated with the traffic scenario data that pertains to the traffic scenario at the particular time stamp (as discussed with respect to block 412 of the method 400). In particular, the data input module 304 may be configured to populate the field of the dataset 132 with the self-reported trust 214 that may be associated with the particular traffic scenario as determined by the data input module 304.

The method 500 may proceed to block 514, wherein the method 500 may include determining self-reported reliability 216. In one embodiment, the data input module 304 may be configured to analyze the crowdsourced data to the determine the self-reported reliability 216 that may be associated with the semi-autonomous or autonomous operation of the vehicle 102 within the particular traffic scenario. As discussed above, the self-reported reliability 216 may be provided by individuals in the form of survey values (e.g., 0-100) that may indicate a subjective reliability that may be associated with a level of manual control or lack of manual control that the driver applies during particular traffic scenarios in which the vehicle 102 is being autonomously or semi-autonomously operated during operation of the vehicle 102 within the particular traffic scenario.

Upon determining the self-reported reliability 216 with respect to the autonomous or semi-autonomous operation of a vehicle 102 within the particular traffic scenario, the data input module 304 may be configured to access the machine learning dataset 132 to populate the field of the dataset 132 that was previously populated with the traffic scenario data that pertains to the traffic scenario at the particular time stamp (as discussed with respect to block 412 of the method 400). In particular, the data input module 304 may be configured to populate the field of the dataset 132 that includes the traffic scenario data with the self-reported reliability 216 that may be associated with the particular traffic scenario as determined by the data input module 304.

Figure 6:
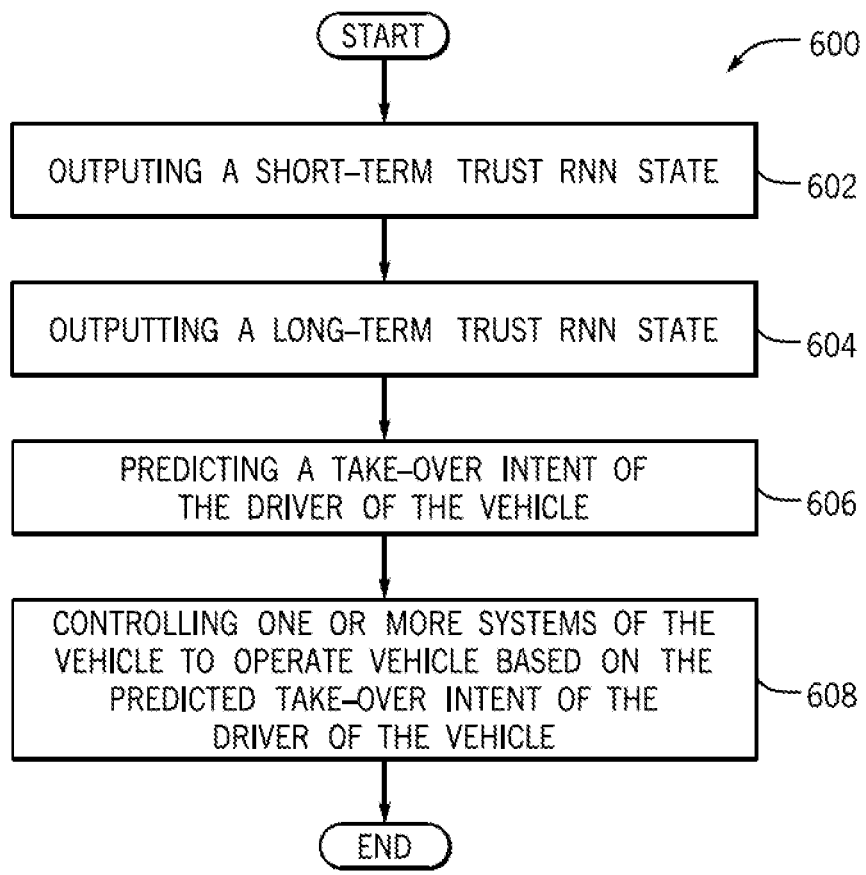
FIG. 6 is a process flow diagram of a method of predicting a take-over intent of the driver of the vehicle according to an exemplary embodiment of the present disclosure.

FIG. 6 is a process flow diagram of a method 600 of predicting the take-over intent of the driver of the vehicle 102 according to an exemplary embodiment of the present disclosure. FIG. 6 will be described with reference to the components of FIG. 1-FIG. 3, through it is to be appreciated that the method 600 of FIG. 6 may be used with other systems/components. The method 600 may begin at block 602, wherein the method 600 may include outputting a short-term trust RNN state 218.

In an exemplary embodiment, upon determination of the automation variables, scene variables, and crowdsourced data (based on the execution of the method 500 of FIG. 5), the data input module 304 may communicate data pertaining to determination of the automation variables, scene variables, and crowdsourced data to the intent prediction module 306 of the trust model application 106. In one embodiment, the intent prediction module 306 may communicate with the dynamic sensors 116, the camera system 118, and the laser projection system 120 to receive dynamic data, image data, and LiDAR data that pertains to the driving scene of the vehicle 102 at a current point in time.

The intent prediction module 306 may be configured to analyze the dynamic data, image data, and LiDAR data to determine traffic scenario data that is associated with the particular traffic scenario in which the vehicle 102 is operating at the current point in time. The traffic scenario data may include electronic data points that include information that pertains to one or more traffic maneuvers of the vehicle 102 and one or more traffic configurations of the driving scene of the vehicle 102 that may take place at the current time stamp. Upon determining the traffic scenario data that is associated with the with the particular traffic scenario in which the vehicle 102 is operating at the current point in time, the intent prediction module 306 may access the machine learning dataset 132 and may query the dataset 132 to access one or more fields that includes traffic scenario data of a particular traffic scenario that was previously populated upon the dataset 132 and that is similar to the particular traffic scenario in which the vehicle 102 is operating at the current point in time.

Upon accessing the one or more fields of the machine learning dataset 132 that include data associated with the similar traffic scenario to the current traffic scenario, the intent prediction module 306 may be configured to communicate with the RNN 108 to capture short-term trust dynamics based on outputting of the short-term trust RNN state 218 based on data included within the one or more fields that include the similar traffic scenario to the current traffic scenario.

In one embodiment, the RNN 108 may be configured to access the field(s) of the dataset 132 that includes the traffic scenario data that pertains to the particular traffic scenario that is similar to the current traffic scenario. As discussed above (at block 412 of the method 400 of FIG. 4) the data input module 304 may populate a field of the dataset 132 with the traffic scenario data to be analyzed at one or more points of time. The field of the dataset 132 may additionally be populated with a time stamp that is associated with the traffic scenario data based on the timestamp at which the traffic scenario occurs. Accordingly, the RNN 108 may be configured to access the machine learning dataset 132 to retrieve datapoints associated with the traffic maneuver of the vehicle 102 and various traffic configuration of the driving scene included within the particular traffic scenario in addition to data points that are associated with each of the automation variables, scene variables, and crowdsourced data (as determined and populated during execution of the method 500 of FIG. 5).

Upon retrieval of the datapoints from the machine learning dataset 132, the RNN 108 may analyze data associated with automation variables that pertain to the particular traffic scenario which include the level of automation transparency 204 and the level of automation reliability 206. In addition, the RNN 108 may analyze data associated with the scene variables that pertain to the particular traffic scenario which include the level of risk 208, the level of scene difficulty 210, and a previous take-over intent 212 of the driver of the vehicle 102. The RNN 108 may additionally analyze the crowdsourced data that pertain to the particular traffic scenario which include the self-reported trust 214 and the self-reported reliability 216.

In one embodiment, the RNN 108 may identify an optimal combination of inputs to be utilized to output the short-term trust RNN state 218. Upon analysis of the data pertaining to the automation variables, scene variables, and crowdsourced data and the utilizing an optimal combination of inputs with respect to the analyzed data, the RNN 108 may output the short-term trust of the driver as a short-term trust RNN state 218. The short-term trust RNN state 218 may capture the effect of an instantaneous vehicle maneuver (e.g., braking, merging, turning, yielding) that may occur during the particular traffic scenario in which the vehicle 102 is being operated. The short-term trust RNN state 218 may capture short-term situational trust factors with respect to the autonomous or semi-autonomous operation of the vehicle 102.

The method 600 may proceed to block 604, wherein the method 600 may include outputting a long-term trust RNN state 220. In an exemplary embodiment, upon outputting the short-term trust RNN state 218, the RNN 108 may input data associated with the short-term trust RNN state 218 as an input for the long-term trust RNN state 220. In other words, as the short-term trust of the driver may have a cumulative effect on the long-term trust of the driver, the output of the short-term trust RNN state 220 is used as an input to determine the long-term trust RNN state 220. In one embodiment, the long-term trust RNN state 220 may capture the driver's long-term trust on the autonomous or semi-autonomous operation of the vehicle 102 that effects the driver's experience during the particular traffic scenario in which the vehicle 102 is being operated.

Accordingly, select automation variables, scene variables, and crowdsourced data may affect the short-term trust of the driver and the long-term trust of the driver with respect to the autonomous or semi-autonomous operation of the vehicle 102. For example, automation variables including the level of automation transparency 204 and the level of automation reliability 206 may affect both the short-term trust and the long-term trust of the driver of the vehicle 102 as these may impact an instantaneous vehicle maneuver and a long-term learned behavior of trust. Also, the level of risk 208 that may be based on the presence or absence of pedestrians within the particular traffic scenario may affect both short-term and long-term trust. In some configurations, the previous take-over intent 212 may have a greater impact on the short-term trust of the driver as it accounts for a short-term state updated based on previous observations from the driver.

With continued reference to the method 600 of FIG. 6, the method 600 may proceed to block 606, wherein the method 600 may include predicting a take-over intent 202 of the driver of the vehicle 102. In one embodiment, the RNN 108 may analyze the current traffic scenario based on current dynamic data, image data, and/or LiDAR data provided by the dynamic sensors 116, camera system 118, and/or laser projection system 120 of the vehicle 102 in addition to the short-term trust RNN state 218 and the long-term trust RNN state 220 to predict the take-over intent 202 of the driver of the vehicle 102. The take-over intent 202 may be predicted as the intent to manually take-over operation of one or more functions of the vehicle 102 in the current traffic scenario as the vehicle 102 is being autonomously or semi-autonomously operated.

The take-over intent 202 may be output as intent data that pertains to a level of intent to manually take over one or more functions of the vehicle 102. For example, the take-over intent 202 may include an intent to take over braking or not take over braking of the vehicle 102 that is being autonomously operated at a traffic intersection with crossing pedestrians as the vehicle 102 is approaching the traffic intersection. In one embodiment, the RNN 108 may output the intent data that pertains to the level of intent to manually take over one or more functions of the vehicle 102 to the intent prediction module 306 of the trust model application 106. Accordingly, the trust model application 106 utilizes the RNN 108 to complete processing of the trust model as a logistic regression model that considers scene difficultly, automation transparency, driving scene risk, and automation reliability along with the take-over intent of the driver at a previous point in time in a similar traffic scenario as input to predict take-over intent 202.

The method 600 may proceed to block 608, wherein the method 600 may include controlling one or more systems of the vehicle 102 to operate the vehicle 102 based on the predicted take-over intent 202 of the driver of the vehicle 102. In one embodiment, the intent prediction module 306 may communicate the intent data to the vehicle control module 308 of the trust model application 106. The vehicle control module 308 may be configured to communicate with the vehicle autonomous controller 110 of the vehicle 102 to control the level of automation transparency and/or an autonomous operation of one or more driving functions of the vehicle 102.

In particular, the vehicle control module 308 may be configured to communicate with the vehicle autonomous controller 110 to autonomously control one or more driving functions of the vehicle 102 based on the predicted take-over intent 202 of the driver of the vehicle 102. In one embodiment, if the take-over intent 202 is predicted to be high with respect to one or more functions of the vehicle 102 (e.g., braking, steering, accelerating), the vehicle control module 308 may be configured to communicate with the vehicle autonomous controller 110 to provide a particular level of automation control of one or more systems of the vehicle 102 that may provide respective functions. Alternatively, if the take-over intent 202 is predicted to be low with respect to one or more functions of the vehicle 102, the trust model application 106 may be configured to communicate with the vehicle autonomous controller 110 to provide a particular level of automation control of one or more systems of the vehicle 102 that may provide respective functions.

Figure 7:
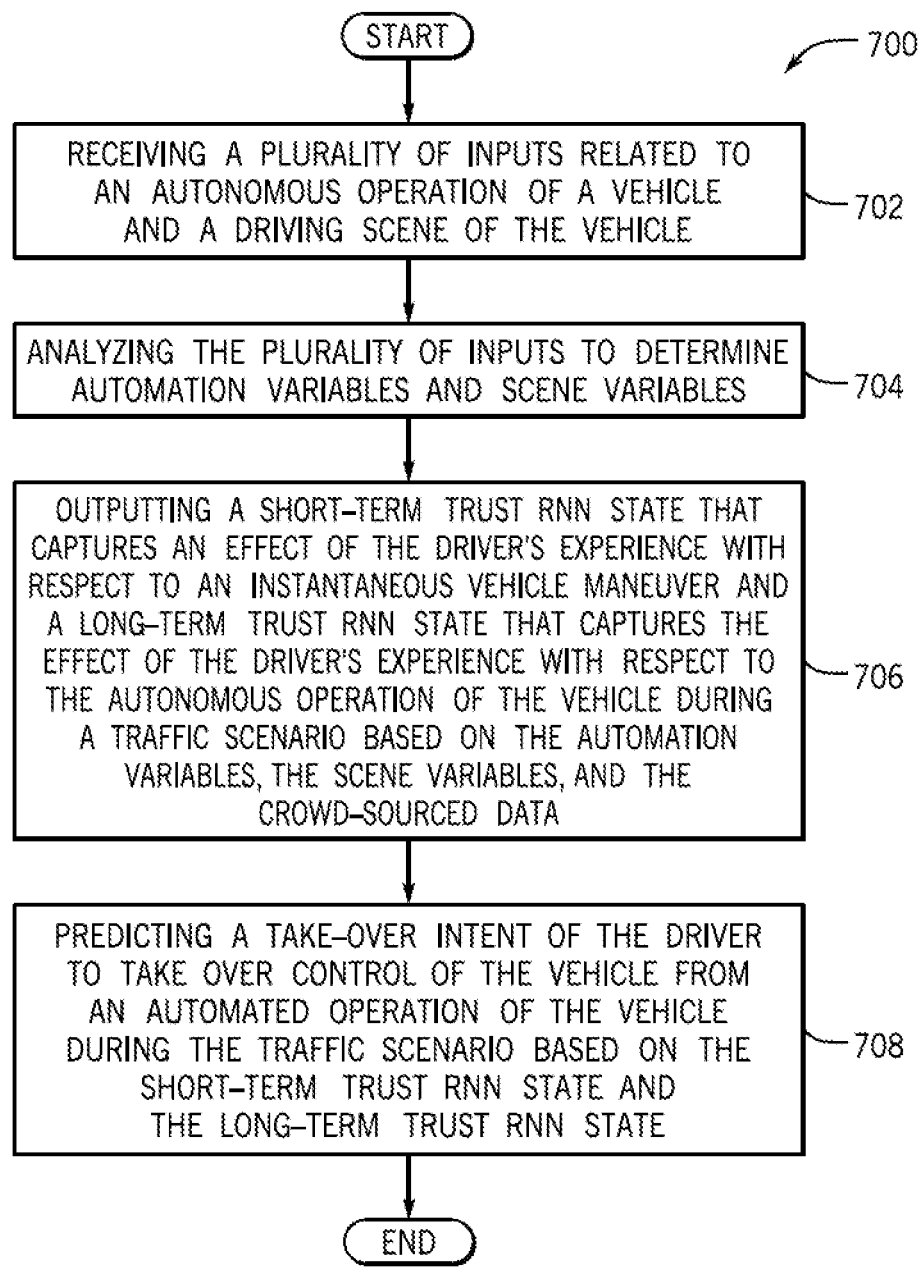
FIG. 7 is a process flow diagram of a method for providing an RNN-based human trust model according to an exemplary embodiment of the present disclosure.

FIG. 7 is a process flow diagram of a method 700 for providing an RNN-based human trust model according to an exemplary embodiment of the present disclosure. FIG. 7 will be described with reference to the components of FIG. 1-FIG. 3, through it is to be appreciated that the method 700 of FIG. 7 may be used with other systems/components. The method 700 may begin at block 702, wherein the method 700 may include receiving a plurality of inputs related to an autonomous operation of a vehicle 102 and a driving scene of the vehicle 102.

The method 700 may proceed to block 704, wherein the method 700 may include analyzing the plurality of inputs to determine automation variables and scene variables. In one embodiment, crowd-sourced data associated with surveys that pertain to a driver's self-reported trust and the driver's self-reported reliability with respect to the autonomous operation of the vehicle 102 is collected and analyzed.

The method 700 may proceed to block 706, wherein the method 700 may include outputting a short-term trust RNN state 218 that captures an effect of the driver's experience with respect to an instantaneous vehicle maneuver and a long-term trust RNN state 220 that captures the effect of the driver's experience with respect to the autonomous operation of the vehicle 102 during a traffic scenario based on the automation variables, the scene variables, and the crowd-sourced data. The method 700 may proceed to block 708, wherein the method 700 may include predicting a take-over intent 202 of the driver to take over control of the vehicle 102 from an automated operation of the vehicle 102 during the traffic scenario based on the short-term trust RNN state 218 and the long-term trust RNN state 220.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for providing an RNN-based human trust model, comprising:
   receiving a plurality of inputs related to an autonomous operation of a vehicle and a driving scene of the vehicle;
   analyzing the plurality of inputs to determine automation variables and scene variables, wherein crowd-sourced data associated with surveys that pertain to a driver's self-reported trust and the driver's self-reported reliability with respect to the autonomous operation of the vehicle is collected and analyzed;
   outputting a short-term trust recurrent neural network state, from a short-term trust recurrent neural network, that captures an effect of the driver's experience with respect to an instantaneous vehicle maneuver and a long-term trust recurrent neural network state, from a long-term trust recurrent neural network, that captures the effect of the driver's experience with respect to the autonomous operation of the vehicle during a traffic scenario based on the automation variables, the scene variables, and the crowd-sourced data; and
   predicting a take-over intent of the driver to take over control of the vehicle from an automated operation of the vehicle during the traffic scenario based on the short-term trust recurrent neural network state and the long-term trust recurrent neural network state,
   wherein the output of the short-term trust recurrent neural network state from the short-term trust recurrent neural network is directly input to the long-term trust recurrent neural network that outputs the long-term trust recurrent neural network state.

2. The computer-implemented method of claim 1, wherein receiving the plurality of inputs includes receiving dynamic data, image data, and LiDAR data, wherein the dynamic data, the image data, and the LiDAR data are analyzed to determine the traffic scenario in which the vehicle is operated.

3. The computer-implemented method of claim 1, wherein the traffic scenario includes data that pertains to at least one traffic maneuver of the vehicle and at least one traffic configuration of the driving scene of the vehicle that takes place at a current time stamp.

4. The computer-implemented method of claim 1, wherein the automation variables include a level of automation transparency that pertains to augmented reality cues that indicate information that are associated with particular autonomous functions that are occurring during the traffic scenario.

5. The computer-implemented method of claim 1, wherein the automation variables include a level of automation reliability that is associated with a level of manual control the driver applies during the traffic scenario.

6. The computer-implemented method of claim 1, wherein the scene variables include a level of risk and a level of scene difficultly, wherein the level of risk is based on a classification and a location of dynamic objects that are located within the driving scene during the traffic scenario and the level of scene difficultly includes environmental factors that influence the autonomous operation of the vehicle during the traffic scenario.

7. The computer-implemented method of claim 1, wherein the scene variables include a previous take-over intent of the driver during a previous traffic scenario that is similar to the traffic scenario at a current time stamp, wherein the previous take-over intent includes data that pertains to a previous traffic scenario that includes at least one matching traffic maneuver of the vehicle and at least one matching traffic configuration of the driving scene of the vehicle to the traffic scenario in which the vehicle is currently operating.

8. The computer-implemented method of claim 1, wherein the self-reported trust indicates a subjective indication of a level of trust with respect to the autonomous operation of a vehicle and the self-reported reliability indicates a subjective reliability that is associated with a level of manual control that the driver applies to operate the vehicle during the traffic scenario.

9. The computer-implemented method of claim 1, wherein the prediction regarding the take-over intent is utilized to provide at least one of: a level of control to at least one system of the vehicle during the traffic scenario and a level of automation transparency during the traffic scenario.

10. A system for providing an RNN-based human trust model comprising:
a memory storing instructions when executed by a processor cause the processor to:
receive a plurality of inputs related to an autonomous operation of a vehicle and a driving scene of the vehicle;
analyze the plurality of inputs to determine automation variables and scene variables, wherein crowd-sourced data associated with surveys that pertain to a driver's self-reported trust and the driver's self-reported reliability with respect to the autonomous operation of the vehicle is collected and analyzed;
output a short-term trust recurrent neural network state, from a short-term trust recurrent neural network, that captures an effect of the driver's experience with respect to an instantaneous vehicle maneuver and a long-term trust recurrent neural network state, from a long-term trust recurrent neural network, that captures the effect of the driver's experience with respect to the autonomous operation of the vehicle during a traffic scenario based on the automation variables, the scene variables, and the crowd-sourced data; and
predict a take-over intent of the driver to take over control of the vehicle from an automated operation of the vehicle during the traffic scenario based on the short-term trust recurrent neural network state and the long-term trust recurrent neural network state,
wherein the output of the short-term trust recurrent neural network state from the short-term trust recurrent neural network is directly input to the long-term trust recurrent neural network that outputs the long-term trust recurrent neural network state.

11. The system of claim 10, wherein receiving the plurality of inputs includes receiving dynamic data, image data, and LiDAR data, wherein the dynamic data, the image data, and the LiDAR data are analyzed to determine the traffic scenario in which the vehicle is operated.

12. The system of claim 10, wherein the traffic scenario includes data that pertains to at least one traffic maneuver of the vehicle and at least one traffic configuration of the driving scene of the vehicle that takes place at a current time stamp.

13. The system of claim 10, wherein the automation variables include a level of automation transparency that pertains to augmented reality cues that indicate information that are associated with particular autonomous functions that are occurring during the traffic scenario.

14. The system of claim 10, wherein the automation variables include a level of automation reliability that is associated with a level of manual control the driver applies during the traffic scenario.

15. The system of claim 10, wherein the scene variables include a level of risk and a level of scene difficultly, wherein the level of risk is based on a classification and a location of dynamic objects that are located within the driving scene during the traffic scenario and the level of scene difficultly includes environmental factors that influence the autonomous operation of the vehicle during the traffic scenario.

16. The system of claim 10, wherein the scene variables include a previous take-over intent of the driver during a previous traffic scenario that is similar to the traffic scenario at a current time stamp, wherein the previous take-over intent includes data that pertains to a previous traffic scenario that includes at least one matching traffic maneuver of the vehicle and at least one matching traffic configuration of the driving scene of the vehicle to the traffic scenario in which the vehicle is currently operating.

17. The system of claim 10, wherein the self-reported trust indicates a subjective indication of a level of trust with respect to the autonomous operation of a vehicle and the self-reported reliability indicates a subjective reliability that is associated with a level of manual control that the driver applies to operate the vehicle during the traffic scenario.

18. The system of claim 10, wherein the prediction regarding the take-over intent is utilized to provide at least one of: a level of control to at least one system of the vehicle during the traffic scenario and a level of automation transparency during the traffic scenario.

19. A non-transitory computer readable storage medium storing instructions that when executed by a computer, which includes a processor perform a method, the method comprising:
receiving a plurality of inputs related to an autonomous operation of a vehicle and a driving scene of the vehicle;
analyzing the plurality of inputs to determine automation variables and scene variables, wherein crowd-sourced data associated with surveys that pertain to a driver's self-reported trust and the driver's self-reported reliability with respect to the autonomous operation of the vehicle is collected and analyzed;
outputting a short-term trust recurrent neural network state, from a short-term trust recurrent neural network, that captures an effect of the driver's experience with respect to an instantaneous vehicle maneuver and a long-term trust recurrent neural network state, from a long-term trust recurrent neural network, that captures the effect of the driver's experience with respect to the autonomous operation of the vehicle during a traffic scenario based on the automation variables, the scene variables, and the crowd-sourced data; and
predicting a take-over intent of the driver to take over control of the vehicle from an automated operation of the vehicle during the traffic scenario based on the short-term trust recurrent neural network state and the long-term trust recurrent neural network state,
wherein the output of the short-term trust recurrent neural network state from the short-term trust recurrent neural network is directly input to the long-term trust recurrent neural network that outputs the long-term trust recurrent neural network state.

20. The non-transitory computer readable storage medium of claim 19, wherein the prediction regarding the take-over intent is utilized to provide at least one of: a level of control to at least one system of the vehicle during the traffic scenario and a level of automation transparency during the traffic scenario.

\* \* \* \* \*